(12) United States Patent  
Grossman et al.

(10) Patent No.: US 9,061,706 B2  
(45) Date of Patent: Jun. 23, 2015

(54) TRACKED VEHICLE WITH MULTIPLE SELF-CONTAINED TRACKED DRIVES AND REMOTE TRACKED DRIVE JETTISONING CAPABILITY

(71) Applicants: Vitaly Grossman, West Bloomfield, MI (US); Boris Mezir, Southfield, MI (US); Mike Nem, Southfield, MI (US)

(72) Inventors: Vitaly Grossman, West Bloomfield, MI (US); Boris Mezir, Southfield, MI (US); Mike Nem, Southfield, MI (US)

( * ) Notice: Subject to any disclaimer, the term of this patent is extended or adjusted under 35 U.S.C. 154(b) by 267 days.

(21) Appl. No.: 13/854,249

(22) Filed: Apr. 1, 2013

(65) Prior Publication Data

US 2013/0226382 A1 Aug. 29, 2013

Related U.S. Application Data

(63) Continuation of application No. 12/892,538, filed on Sep. 28, 2010, now Pat. No. 8,408,340.

(51) Int. Cl.
| | |
|---|---|
| *B62D 55/00* | (2006.01) |
| *B62D 11/04* | (2006.01) |
| *B62D 55/065* | (2006.01) |
| *B62D 55/084* | (2006.01) |

(52) U.S. Cl.
CPC .............. *B62D 11/04* (2013.01); *B62D 55/065* (2013.01); *B62D 55/084* (2013.01); *Y10T 29/49824* (2015.01); *B62D 55/00* (2013.01)

(58) Field of Classification Search
CPC ...... B62D 55/00; B62D 55/06; B62D 55/065; B62D 55/08; B62D 55/084; B62D 55/10; B62D 55/32
See application file for complete search history.

(56) References Cited

U.S. PATENT DOCUMENTS

| | | | | |
|---|---|---|---|---|
| 2,128,273 | A | * | 8/1938 | Stevens ...................... 280/6.153 |
| 3,423,859 | A | * | 1/1969 | Petersik et al. ................. 37/382 |
| 4,166,511 | A | * | 9/1979 | Stedman ........................ 180/9.5 |
| 4,591,015 | A | * | 5/1986 | Korppoo et al. .............. 180/119 |
| 4,977,971 | A | * | 12/1990 | Crane et al. .................... 180/8.3 |
| 5,337,846 | A | * | 8/1994 | Ogaki et al. ................... 180/8.2 |
| 5,590,977 | A | * | 1/1997 | Guntert et al. ................ 404/101 |
| 6,655,482 | B2 | * | 12/2003 | Simmons ...................... 180/9.1 |
| 2007/0169968 | A1 | * | 7/2007 | Todd et al. ..................... 180/9.1 |
| 2008/0196947 | A1 | * | 8/2008 | Brazier ......................... 180/9.5 |
| 2010/0012399 | A1 | * | 1/2010 | Hansen ........................ 180/9.26 |
| 2011/0036650 | A1 | * | 2/2011 | Simula et al. ................ 180/9.44 |

* cited by examiner

*Primary Examiner* — Joseph Rocca
*Assistant Examiner* — Conan Duda
(74) *Attorney, Agent, or Firm* — Kohn & Associates PLLC

(57) ABSTRACT

A tracked vehicle having a plurality of self contained tracked drive units, each unit including an electric motor to propel a track belt, and a plurality of road wheels and tensioning wheels. Each tracked drive unit is connected to the vehicle by affixing devices and by electrical, data, and fluid lines, and is separable from the vehicle by detachment of the affixing devices and disconnection of the electrical, data, and fluid lines. The tracked vehicle can locomote upon the tracked drive units remaining after the separation a tracked drive unit. A tracked vehicle with remote tracked drive jettisoning capability, wherein a tracked drive unit is affixed to the hull of the tracked vehicle by explosive bolts; the electrical, fluid, and data lines are severable by severing charges; and the tracked drive is jettisonable by remote commands to detonate the explosive bolts and sever the electrical, data, and fluid lines.

25 Claims, 14 Drawing Sheets

TRACKED VEHICLE WITH MULTIPLE SELF-CONTAINED TRACKED DRIVES AND REMOTE TRACKED DRIVE JETTISONING CAPABILITY

TECHNICAL FIELD

The present invention relates to tracked drive vehicles, and more specifically to tracked drive vehicles having tracked drive units that are that can be separated and replaced as a single self contained unit, and to vehicles which can jettison a tracked drive unit by remote commands from an operator and continue to locomote after the jettisoning of a tracked drive unit.

BACKGROUND OF THE INVENTION

Tracked vehicles are commonly used as a platform for specialized equipment and for transport of personnel over rough, soft, or snowy terrain where wheeled vehicles cannot function. Such vehicles include pavers, harvesters, military vehicles, and earthmovers. A typical tracked vehicle includes a two track assemblies, one located on each lateral side of the vehicle. Each track assembly includes a single continuous track, mounted about driven by a drive wheel engaged to the inner surface of the track, and a plurality of road wheels and idlers. The drive wheels are powered by an internal combustion engine or electric motor housed within the hull of vehicle and connected to the drive wheel via a transmission. The drive wheels and other wheels are attached to the body by a variety of axle and suspension assemblies. Hydraulic fluid lines pass from the body into the track assemblies to power brakes engaged to the road wheels.

Conventional tracked vehicles, with a single continuous track assembly on each side, have a number of drawbacks. If one track assembly is incapacitated, the vehicle cannot be driven until the track assembly is disassembled, the problem is diagnosed, and a repair is made. This can be inconvenient or impossible when the vehicle is at a great distance from a repair shop and maintenance personnel, and hazardous to the vehicle crew when the track is damaged in an inclement or hostile environment. The repair of conventional tracked vehicles also poses costly logistical problems. Trained technicians skilled in diagnosing and repairing track assemblies must accompany the tracked vehicle or be kept within rapid travel distance. A large array of spare parts must maintained and kept available for rapid shipping. When the vehicle is in a remote location, shipping is can be difficult or impossible.

When a conventional tracked vehicle suffers the incapacitation of a track assembly in a remote or hostile location, the crew of the vehicle may be endangered. They may be stranded until a repair crew and parts arrive. Even if the crew is able to leave the vehicle and make repairs, they may be endangered by exposure to harsh climate or other environmental hazards.

Conventional tracked vehicles also have shortcomings in terms of hull configuration and space and weight distribution. The hull bottoms are riddled with gaps and projections to accommodate the axles, suspension assemblies, transmissions, and hydraulic lines required to connect the track assemblies to the hull and to an engine housed within the hull. The complex and partially open structure of the hull bottom renders the vehicle vulnerable to water infiltration, snagging on projecting terrain features, and upward-directed explosive forces. Furthermore, space that could be occupied by crew is instead consumed by the engine and transmission components.

There is a need for a tracked vehicle with track assemblies that can be readily removed and replaced as a unit, by unskilled crew. There is a need for a tracked vehicle which can suffer the loss of a track assembly and continue to locomote. There is a need for a tracked vehicle wherein the elements of a motor and suspension are contained within the track assemblies and not within the hull of the vehicle.

SUMMARY OF THE INVENTION

The present invention provides a tracked vehicle including a hull and a plurality of self contained tracked drive units connected to said hull, the hull containing an electrical power plant, a driving control system, and a motor cooling system. Each of the self contained tracked drive units includes a frame to contain an electric motor, a drive wheel to propel a track belt, the drive wheel being powered by the electric motor, a plurality of road wheels to support the tracked vehicle, and a plurality of tensioning wheels to maintain the track belt in constant tension about the drive wheel and the road wheels. Each of the self contained tracked drive units is connected to the hull by affixing devices to affix the frame to corresponding mounting devices on the hull, by an electrical cable to transmit electrical power from the power plant to the electric motor, by a coolant fluid line to convey coolant fluid from the cooling system to the electric motor, and by a control and data cable to convey electronic signals between the driving control system and the tracked drive unit. The tracked vehicle is separable from each of the self contained tracked drive units by detachment of the affixing devices from the mounting devices on the hull, the disconnection of the electrical cable from the electric motor, the disconnection of the coolant fluid line from the electric motor, and the disconnection of the control and data cable from the self contained tracked drive unit.

The present invention also provides a tracked vehicle with remote tracked drive jettisoning capability, the tracked vehicle including a plurality of self contained tracked drive units connected to the hull of the tracked vehicle, which contains an electrical power plant, a driving control system, and a motor cooling system. Each of the self contained tracked drive units includes a drive unit includes a frame to contain an electric motor, a drive wheel powered by the electric motor, to propel a track belt, a plurality of road wheels to support the tracked vehicle, and a plurality of tensioning wheels to maintain the track belt in constant tension about the drive wheel and the road wheels. Each of the self contained tracked drive units is connected to the hull by explosive affixing devices to affix the frame of the self contained tracked drive unit to corresponding mounting devices on the hull, the explosive affixing devices being destructable by detonation; an electrical cable to transmit electrical power from the power plant to the electric motor, a coolant fluid line to convey coolant fluid from the cooling system to the electric motor, and a control and data cable to convey electronic signals between the driving control system and the self contained tracked drive unit. The electrical, coolant fluid line, and control and data cable are each severable by an explosive severing charge situated about the electrical cable, the coolant fluid line, and the control and data cable. To prevent electrical shorting and loss of coolant fluid, the said electrical cable includes an electrical shut-off switch, the coolant fluid line includes a coolant fluid shut-off valve, and the control and data cable includes a data shut-off switch. Each of the self contained tracked drive units is separable from the tracked vehicle upon the destruction of the explosive affixing devices and the severance of the electrical cable, control and data cable, and the coolant fluid line. The tracked vehicle also includes a remote jettisoning system including a shut-off circuit to actuate the electrical shut-off switch, the coolant fluid shut off switch, and the data shut-off switch; and a detonation circuit to detonate the explosive affixing devices and said severing charges. The remote jettisoning system also includes a remote jettisoning control to activate the shut-off circuit and the detonation circuit. In the preferred embodiment, the tracked vehicle retains the ability to locomote on its remaining self contained tracked drive units after the jettisoning of at least one of its self contained tracked drive units.

The present invention further provides a self contained tracked drive unit for use with a tracked drive vehicle having a hull containing an electrical power plant, a driving control system, and a motor cooling system. Each of the self contained tracked drive units includes a frame to contain an electric motor, a drive wheel to propel a track belt, the drive wheel being powered by the electric motor, a plurality of road wheels to support the tracked vehicle, and a plurality of tensioning wheels to maintain the track belt in constant tension about the drive wheel and the road wheels. Each of the self contained tracked drive units is connected to the hull by affixing devices to affix the frame to corresponding mounting devices on the hull, by an electrical cable to transmit electrical power from the power plant to the electric motor, by a coolant fluid line to convey coolant fluid from the cooling system to the electric motor, and by a control and data cable to convey electronic signals between the driving control system and the tracked drive unit. The tracked vehicle is separable from each of the self contained tracked drive units by detachment of the affixing devices from the mounting devices on the hull, the disconnection of the electrical cable from the electric motor, the disconnection of the coolant fluid line from the electric motor, and the disconnection of the control and data cable from the self contained tracked drive unit.

The present invention still further provides a method for remotely jettisoning a self contained tracked drive unit from a tracked vehicle having multiple self contained tracked drive units, each tracked drive unit being contained in a frame. The method includes the steps of actuating a remote jettisoning control, activating a detonation circuit, detonating a severing charge situated about an electrical cable connecting an electrical distributor to a motor of each self contained tracked drive unit, severing the electrical cable, detonating a severing charge situated about a data and control cable connecting a driving control processor to a motor controller and to a track speed sensor of the tracked drive unit, severing the data and control cable, detonating a severing charge situated about a coolant fluid line connecting a motor cooling system to the electric motor of the tracked drive unit, severing the coolant fluid line, detonating a plurality of explosive affixing devices attaching the frame of the tracked drive unit to a plurality of mounting devices on a hull of the tracked drive vehicle, detaching the frame of the tracked drive unit from the plurality of mounting devices, and remotely jettisoning the tracked drive unit from the tracked vehicle.

The present invention also provides a method controlling the locomotion of a tracked vehicle including a plurality of self contained tracked drive units. The method includes the steps of receiving at a driving control processor a driving instruction regarding the course and speed of the tracked vehicle from an operator of the tracked vehicle, comparing the driving instruction with the actual course and speed of the tracked vehicle, detecting a discrepancy between the driving instruction and the actual course and speed of the tracked vehicle, issuing a command to correct the discrepancy between the driving instruction and the actual course and speed of the tracked vehicle, receiving the command at an electrical distributor electrically connected to the electric motor of each tracked drive unit, regulating the electrical current delivered to the electric motor of each tracked drive unit, modifying the speed or direction of movement of each of the tracked drive units, bringing the course and speed of the tracked vehicle into conformance with the driving instruction issued by an operator, and controlling the locomotion of the tracked vehicle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
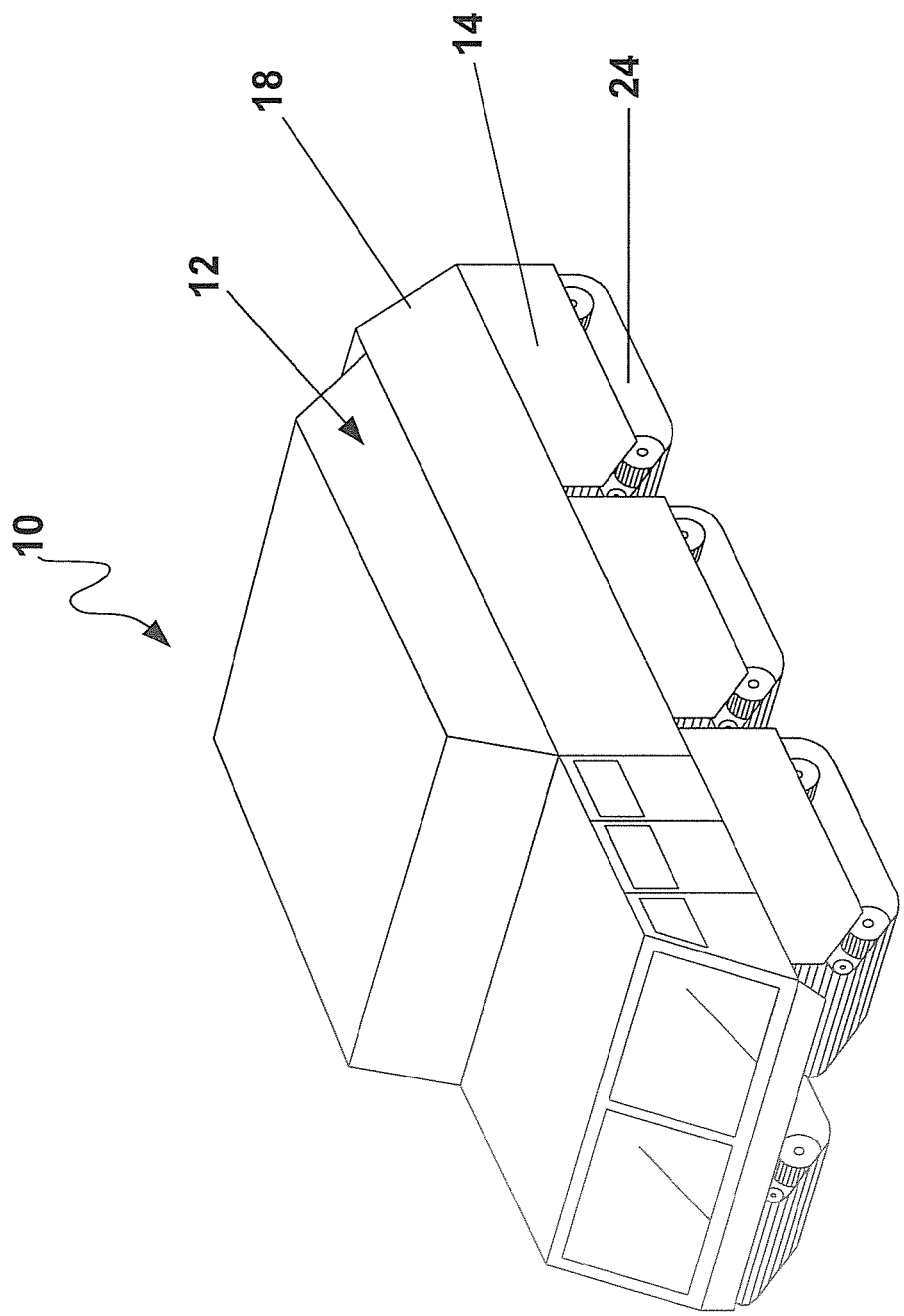
FIG. 1 shows a side elevation of a tracked vehicle according to the present invention.
Figure 2:
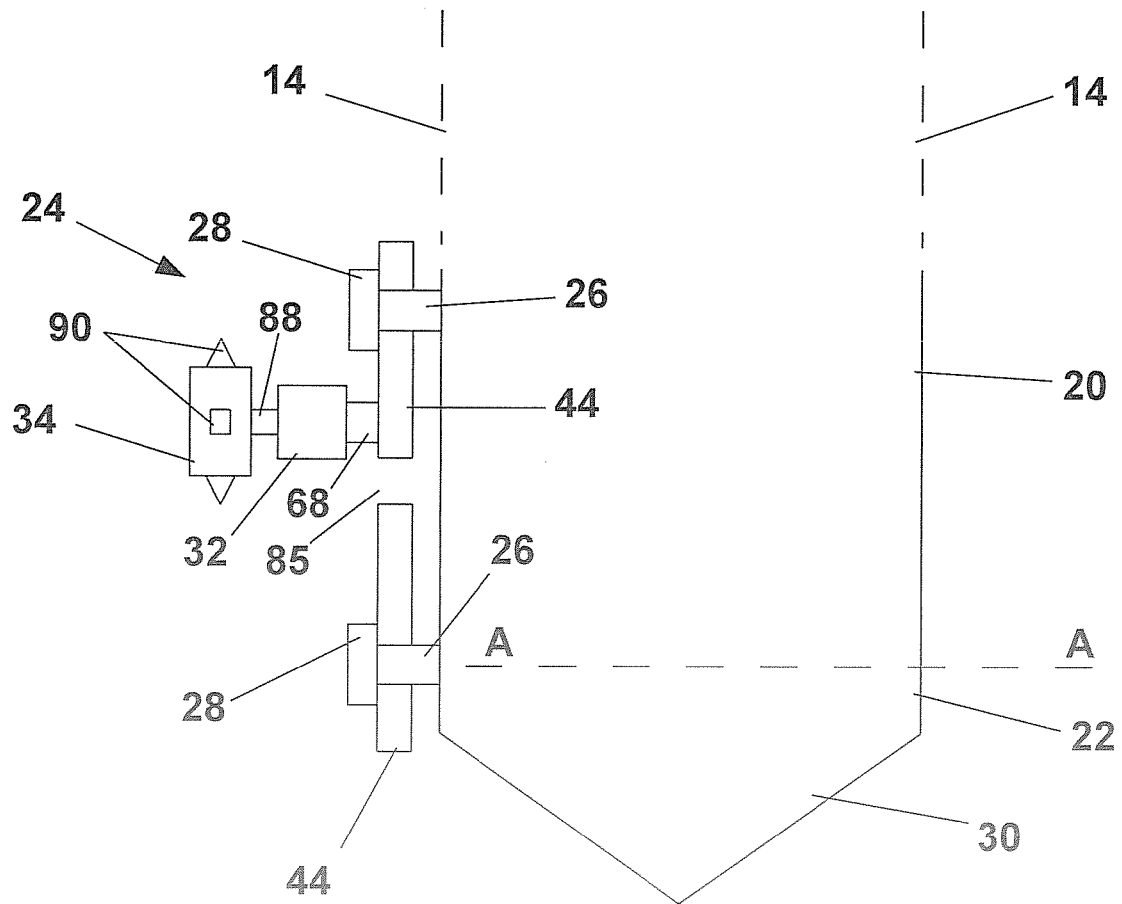
FIG. 2 shows a cross section taken through a tracked vehicle of the present invention at the level of tracked drive unit, emphasizing the attachment of the tracked drive unit to a lateral side of the tracked vehicle and the v-shaped bottom of the tracked vehicle.

A tracked vehicle according to the present invention, generally shown at 10 in FIG. 1, includes a hull 12 having two lateral sides 14, an anterior end 16, and a posterior end 18. The tracked vehicle 10 includes a plurality of self contained tracked drive units 24 mounted in supporting relationship to the hull 12. Preferably at least three tracked drive units 24 are mounted on each lateral side 14 of the tracked vehicle 10 but any number of tracked drive units 24 required to support a desired load or maintain a desired speed can be included. Each tracked drive 24 is affixed to a lateral side 14 of the hull 10 by means of at least one mounting device projecting from the lateral side 14. The mounting device is preferably a threaded mounting post 26, and the tracked drive 24 is preferably affixed to the mounting post 26 by means of an affixation device such as a bolt 28, as shown in FIG. 2. Preferably, four mounting posts 26 are provided. Alternatively, any suitable readily releasable affixation and mounting devices known in the art can be included. An axis extending through the mounting posts 26 or other mounting devices, shown as the dotted line A-A in FIG. 2, is used herein to define an upper portion, 20, and a lower portion 22 of the hull 12. The lower portion of the hull 12 includes a bottom 30.

Each tracked drive unit 24 receives electrical power, driving commands and coolant fluid from systems housed within the hull 12 of the tracked vehicle 10 but is otherwise self contained. That is, each tracked drive unit 24 includes an electric motor 32 which powers a drive wheel 34 to propel an endless track belt 36; a suspension system and track tensioning system, preferably combined as a unitary torsion spring assembly 38; and motor control devices 40 and speed sensors 42 as required. These drive, tensioning, and suspension components are mounted on a frame 44 which is affixed to a lateral side 14 of the hull 12. The only required connections between the tracked drive unit 24 and the hull 12 are the bolts 28 or other affixing devices that affix the frame 44 of the tracked drive unit 24 to the mounting posts 26 of the hull 12; an electrical cable 46 to power the electric motor 32; a control and data cable 48 to transmit commands and feedback between the tracked drive unit 24 and a driving control system 50 situated within the hull 12; and a coolant fluid line 52, to convey coolant between the electric motor 32 and a motor cooling system 54 situated within in the hull 12. No drive train or suspension components or other mechanical or electronic components physically link the tracked drive unit 24 to the hull 12.

The self contained structure of the tracked drive unit 24 confers several advantages upon the tracked vehicle 10. Since the lower portion 22 of the hull 12 is unencumbered with mechanical projections or electrical connections, it can be composed of a single, smooth-surfaced expanse of metal or other hardened material, without gaps, apertures, or projections. The bottom 30 of the hull can have any desired shape, such as a V-shape, as best shown in FIG. 2. A smooth, V-shaped, gapless bottom 30 enables the tracked vehicle 10 to better resist moisture, snags, and upward directed explosive force than the tracked vehicles known in the prior art. The apertures required for the exit of the electrical cable 46, control and data cable 48, and coolant fluid line 52 from the hull 12 are preferably situated in the upper portion 20 of the hull 12.

The self contained structure of the tracked drive unit 24 also greatly simplifies the tasks of spare parts supply and repair, especially when the tracked vehicle 10 is damaged in the field. A damaged or malfunctioning tracked drive unit 24 can be removed quickly and easily as a single unit by disconnecting the electrical cable 46, the control and data cable 48, and the coolant fluid line 52, from the hull 12 and then unfastening the bolts 28. A replacement tracked drive unit 24 is quickly and easily mounted, by affixing the replacement drive unit to the mounting posts 26, and connecting the electrical cable 46, the control and data cable 48, and the coolant fluid line 52. No specialized skills are required for the removal and replacement of a tracked drive unit 24. A damaged tracked drive unit 24 can be shipped to a repair facility, or be discarded. The compact unitary structure of the tracked drive unit 24 of the present invention also renders the tracked drive unit 24 easily transportable, and readily air dropped to a remote location where roads are not available. In contrast, when a tracked drive of the prior art is disabled, it must be disassembled, the problem must be diagnosed, the specific inoperative parts must be ordered and shipped, and must usually be installed by a skilled mechanic.

The tracked vehicle 10 of the present invention can also carry a larger payload or crew than comparable tracked vehicles wherein the tracked drives are powered via a transmission from a single electric motor housed within the hull. In a tracked vehicle 10 of the present invention, space within the hull 12 that would have been consumed by a motor and transmission is used for payload or crew.

In the preferred embodiment, the tracked vehicle 10 of the present invention has tracked drive jettisoning capability. The term "tracked drive jettisoning capability" as used herein refers to the ability of the tracked drive vehicle 10 to separate from one or more of its tracked drive units 24 without interruption of its ability to locomote.

Whereas a conventional tracked vehicle is crippled and immobilized by the disablement of one track, each self contained tracked drive unit 24 of the present invention continues to function independently after the jettisoning of an adjacent tracked drive unit 24. The tracked drive jettisoning capability of the tracked vehicle 10 is provided by the self contained, independent and easily separated nature of each tracked drive unit 24, and by the provision of a sufficient number of tracked drive units 24 to support the weight of the tracked vehicle 10 and to provide power sufficient for locomotion after the jettisoning of a tracked drive unit 24. The preferred minimum number of tracked drive units 24 to provide tracked drive jettisoning capability is six, with three tracked drive units 24 on each lateral side 14 of the tracked vehicle 10. A tracked vehicle 10 with six or more tracked drive units 24 on each lateral side 14 can continue to locomote after the loss of a single tracked drive unit 24, provided that the vehicle is suitably balanced. In less preferred embodiments of the tracked vehicle 10, two tracked drive units 24 on each lateral side 14 can provide tracked drive jettisoning capability to a suitably balanced tracked drive vehicle 10.

The tracked drive jettisoning capability of the tracked vehicle 10 of the present invention greatly increases the safety of crew members when a tracked drive unit 24 is disabled at a remote location or in a hostile environment. Although top driving speed will likely be reduced by the loss of a tracked drive 24, the tracked vehicle 10 can still proceed to safety. Costly loss of vehicles by abandonment in remote or hostile situations, or the cost and hazard of a mission of retrieval, is also avoided, as the tracked vehicle 10 can be driven to a repair facility under its own power. In contrast, when one track of a conventional tracked drive vehicle is disabled, the vehicle is immobilized until the drive is disassembled and repaired. In remote or hostile environments, a conventional tracked drive vehicle may have to be abandoned altogether.

Because a tracked vehicle typically steers by adjusting the relative speeds of its left and right tracks, the jettisoning of a tracked drive unit 24 will change the steering characteristics of the tracked vehicle 10. The present invention also provides a driving control system 56 which not only controls the relative speeds of the tracked drive units 24 during routine driving, but also, after the jettisoning of a tracked drive unit 24, automatically adjusts the relative speeds of the remaining tracked drive units 24 to compensate for the loss. The driving control system 56 of the present invention allows an operator to control the tracked vehicle 10 after the loss of a tracked drive unit 24 without special procedures or training to do so.

Figure 8:
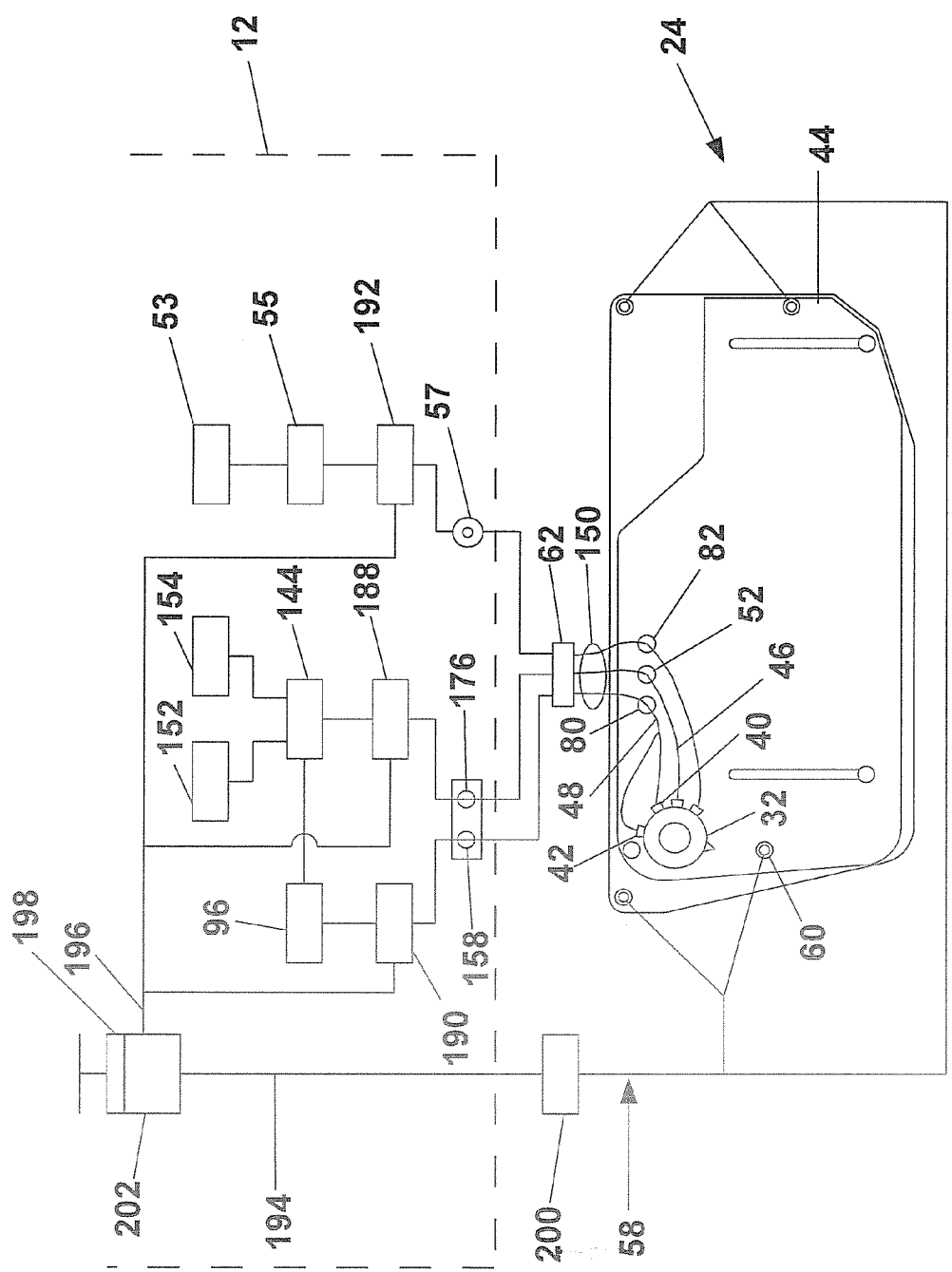
FIG. 8 shows a schematic diagram of an exemplary remote jettisoning system of the present invention, with the hull of the tracked vehicle represented by a dotted rectangle.

In another preferred embodiment, the tracked vehicle 10 of the present invention includes remote tracked drive jettisoning capability. That is, not only can a self contained tracked drive 24 be jettisoned, but it can be jettisoned by means of a remote command, preferably a remote command from an operator situated within the tracked vehicle 10, without interruption of ability to locomote. The remote tracked drive capability of the tracked vehicle 10 is provided by a remote tracked drive jettisoning system 58 which is best shown in FIG. 8 and which will be described in detail. Briefly, the remote tracked drive jettisoning system 58 of the present invention includes explosive bolts 60 or other explosive affixing to dismount a tracked drive unit 24 from its mounting posts 26 by detonation of the explosive bolts 60; one or more severing charges 62 to sever the cable and fluid line connections between the hull 12 and the tracked drive 24; and shut-off switches and valves, to be described, to prevent electrical short circuits and loss of coolant fluid after jettisoning. The remote tracked drive jettisoning capability of the present invention greatly increases the safety of an operator in inclement or otherwise hostile environments, because all of the actions of jettisoning can be accomplished from within the hull 12 of the tracked vehicle 10.

Figure 3A:
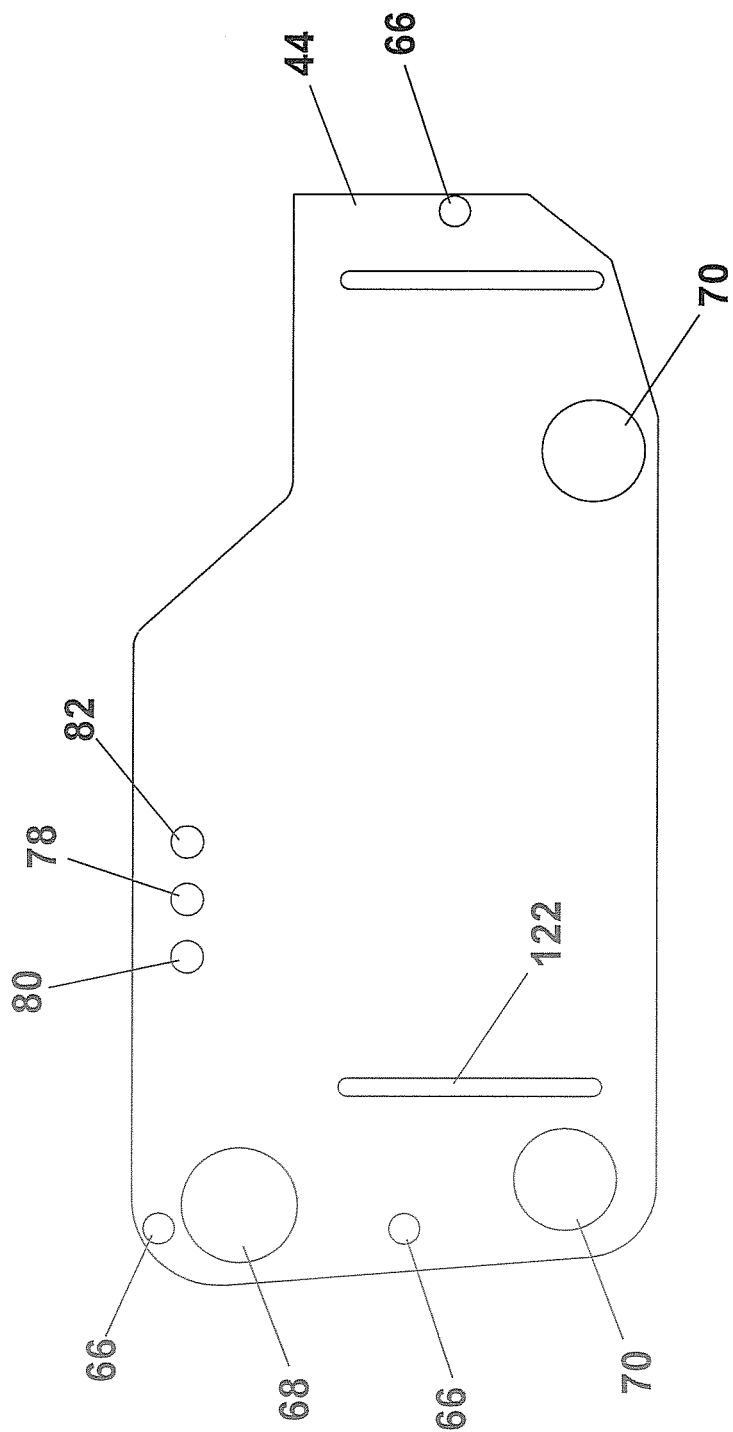
FIG. 3A shows a frontal view of a frame wall of a tracked drive unit of the present invention, with motor, road wheels, tensioning wheels, and track belt removed.
Figure 3B:
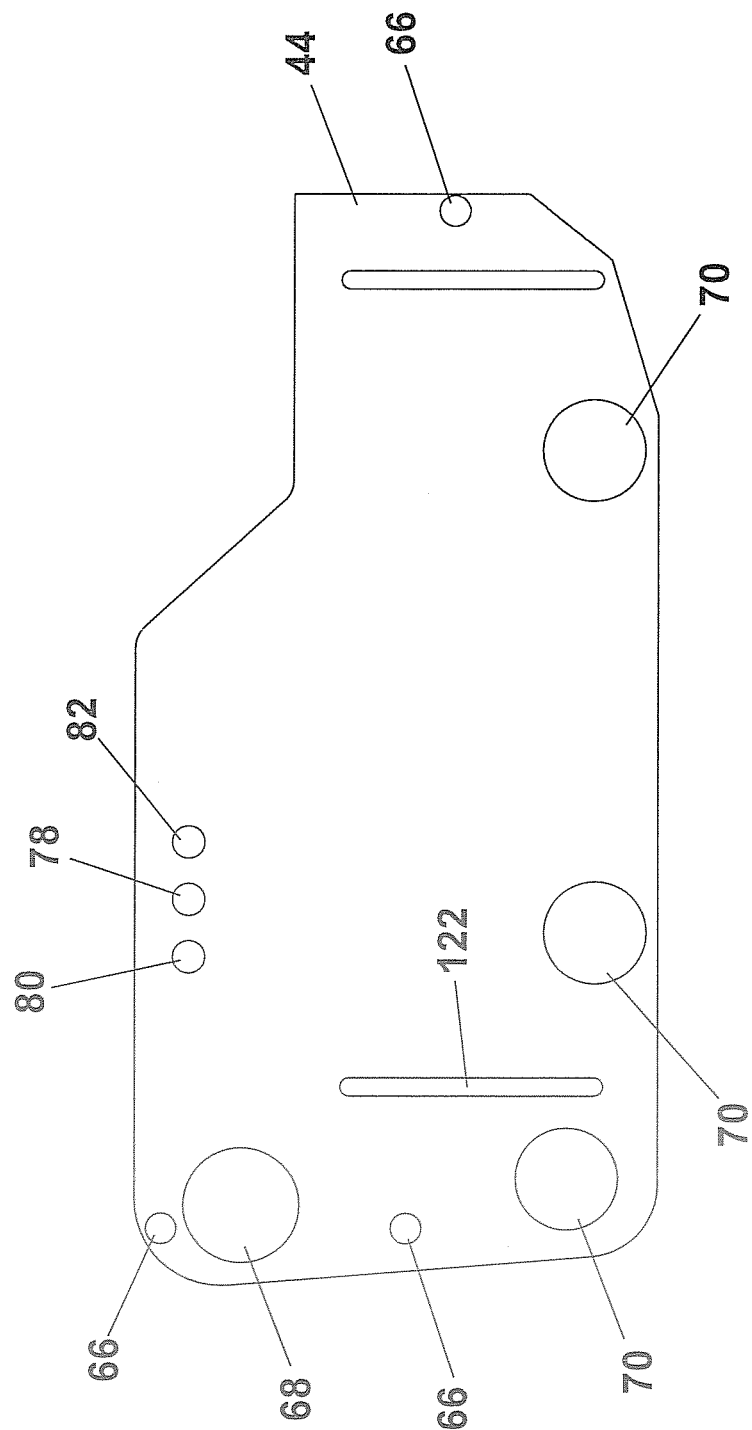
FIG. 3B shows a frontal view of a frame wall of a tracked drive unit which, accommodates three road wheels.

A tracked drive unit 24 of the present invention includes a generally rectangular frame 44 mountable on a lateral side 14 of the hull 12. The frame 44 includes at least one mounting aperture 66 to receive a threaded mounting post 26 or other mounting device projecting from the lateral side 14 of the vehicle 10. Preferably, three mounting apertures 66 are provided, as shown in FIGS. 3A and 3B, and three mounting posts 26 are provided in alignment with the mounting apertures 66. The frame 44 is affixable to each mounting post 26 by an affixing device, preferably a plurality of bolts 28 threadable onto the mounting posts 26. The frame 44 can include additional outward projecting skirts or lips (not shown) as required for support of the vehicle 10 or for physical protection of the tracked drive unit 24.

Projecting outward from the frame 44 are at least one motor mount 68 to attach at least one electric motor 32 to the tracked drive unit 24, and at least one suspension hub 70 to attach a torsion spring assembly 38 including a road wheel 74 and a tensioning wheel 76, to the tracked drive unit 24. Alternatively, the suspension hub 70 can be used to attach a conventional suspension arm and road wheel assembly of any suitable type known in the art (not shown). In embodiments of the tracked drive unit 34 having more than two road wheels 74, at least one suspension hub 70 is used to attach a modified torsion spring assembly 39, to be described in detail. The inclusion of three or more road wheels 74 increases the cargo-carrying capacity of the tracked vehicle 10.

Preferably, the motor mount 68 is situated in proximity to the anterior edge of the frame 44, above road level, and at least two suspension hubs 70 are preferably situated below the electric motor 32, with a one suspension hub 70 preferably situated in an anterior portion of the frame 44 and a second suspension hub 70 situated in a posterior portion of the frame 44. The frame 44 also includes an electrical cable aperture 78 to allow passage of the electrical cable 46 from the hull 12 to the electric motor 32; a control and data cable aperture 80 to allow passage of the control and data cable 48 from the hull 12, to the electric motor 32 and to any motor control devices 40 and sensors 42 situated in the tracked drive unit 24; and a coolant fluid line aperture 82, to allow passage of the coolant fluid line 52 from the motor cooling system 54 the electric motor 32. In one embodiment of the present invention, a single unitary aperture 84 in the frame 44 allows passage of the electrical cable, 46, data and control cable 48 and the coolant fluid line 52.

The tracked drive unit 24 also includes at least one drive unit 86, preferably one drive unit 86, including an electric motor 36 affixed to the motor mount 68, the electric motor 32 including a motor shaft 88. The drive unit 86 also includes a drive wheel 34 to propel a track belt 36. The drive wheel 34 includes a plurality of sprockets 90 enageable with a plurality of teeth 92 arrayed along the length of the inner side 94 of the track belt 36. The electric motor 32 of the tracked drive unit 24 can include any electrical motor of suitable electrical input and power output, selected according to the size, weight, and desired speed of the tracked vehicle 10.

The electric motor 32 of each tracked drive unit 24 is powered by electrical current provided by an electrical distributor 144, situated within the hull 12. The electric motor 32 is also communicatively connected to a motor control device 40 to control the operation of the electric motor 32 according to commands issued by a driving control processor 96, situated within the hull 12. Preferred examples of a motor control device 96 include but are not limited to a motor reversal switch and a motor speed controller (not shown). The tracked drive unit 24 also preferably includes a track speed sensor 42, to sense the speed of the tracked drive unit, preferably by sensing the rotation speed of the drive wheel 34. The track speed sensor 42 is communicatively connected to the driving control processor 96.

Figure 4A:
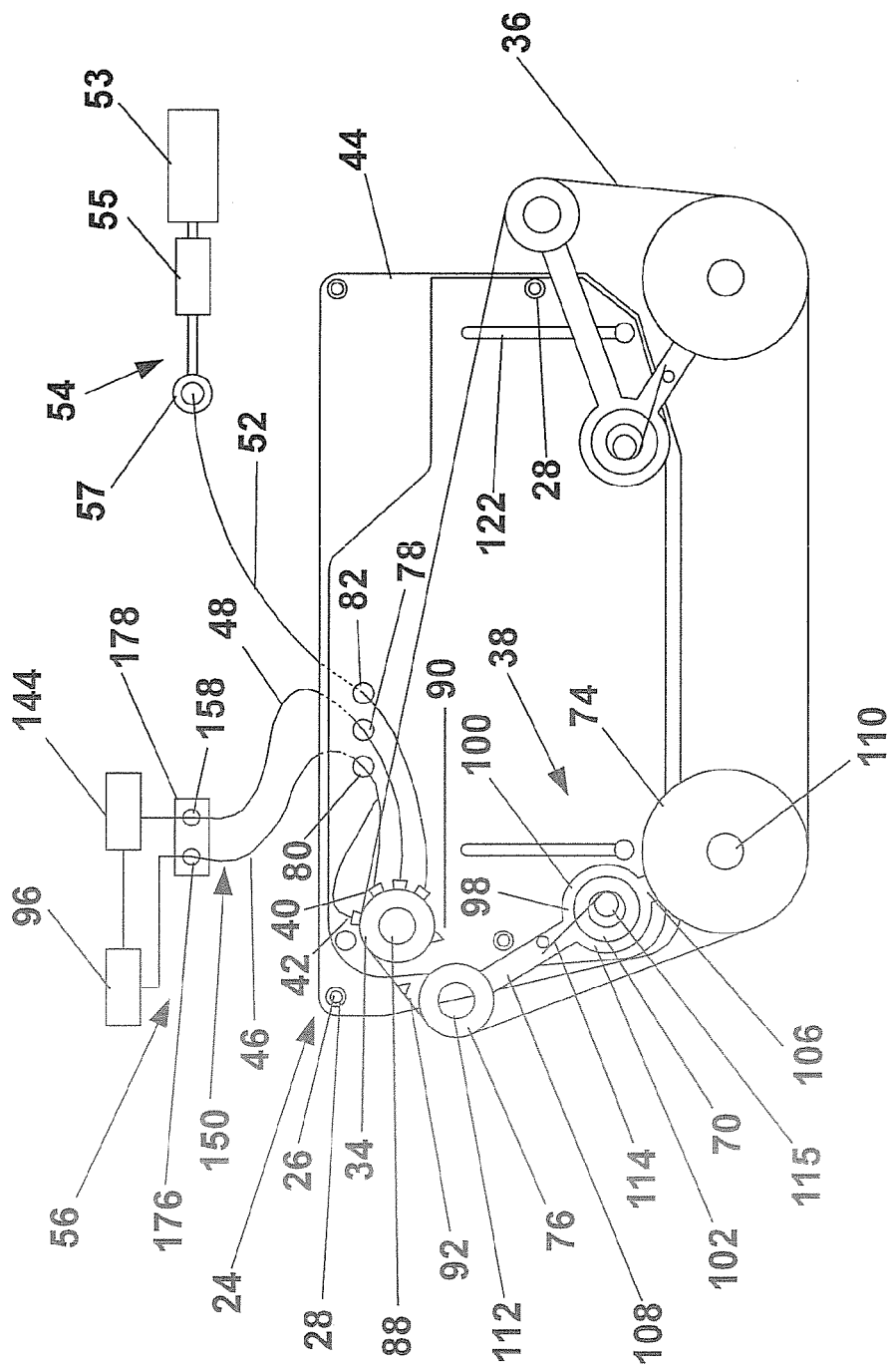
FIG. 4A shows a frontal semi-schematic view of a tracked drive unit of the present invention.
Figure 4B:
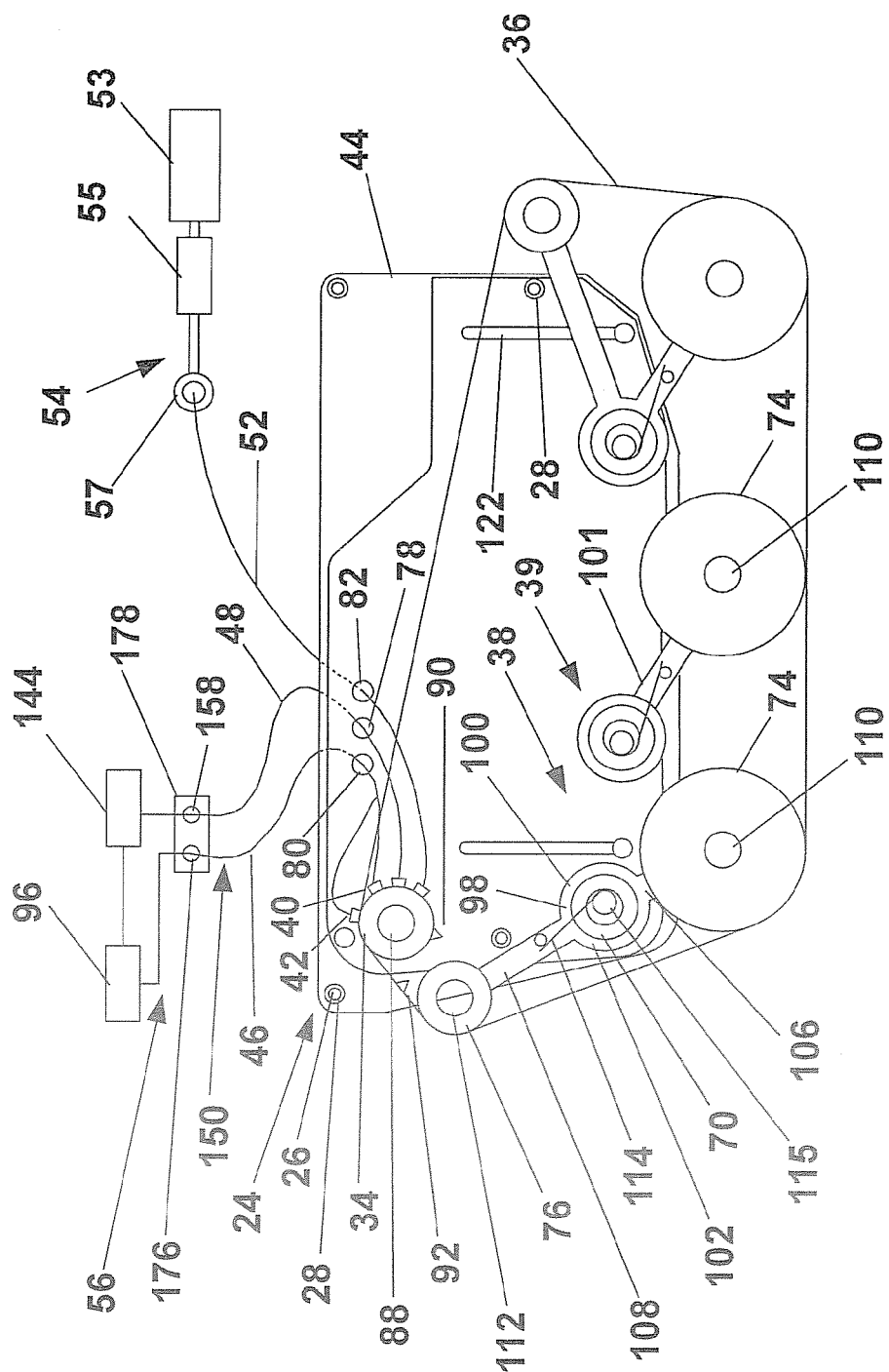
FIG. 4B shows a tracked drive unit having three road wheels.

The electric motor 32 of each tracked drive unit includes cooling coils (not shown) which are in fluid connection with the coolant fluid line 52. The tracked vehicle 10 preferably includes a motor cooling system 54 to provide liquid coolant to each the electric motor 32 as shown in FIGS. 4A and 4B. The motor cooling system 54 is situated within the hull 12 and can include any suitable type and size of motor cooling system, selected according to the size and heat production of the electric motor 32. The motor cooling system preferably includes at least a cooling unit 53 to reduce the temperature of coolant fluid, and a coolant pump 55 connected to a plurality of coolant fluid lines 52, each coolant fluid line 52 circulating coolant fluid between the cooling unit 53 and each electric motor 32. Each coolant fluid line 52 includes an outflow sub-line (not shown) to convey liquid coolant towards an electric motor 32, and a return sub-line (not shown) to return coolant fluid to the cooling unit 53. Each coolant fluid line 52 is attachable to the an electric motor 32 by a fluid connector device (not shown) of any suitable type known in the art. Each coolant fluid line 52 exits the hull 12 through a coolant line outlet 57 defined in a lateral side 14 of the hull 12 in proximity to each tracked drive unit 24. Each coolant fluid line 52 enters tracked drive unit 24 via a coolant fluid aperture 82 in the frame 44, or via a common unitary aperture 84 through which the electrical cable 46, control and data cable 48, and coolant fluid line 52 both all enter the tracked drive unit 24.

The tracked drive unit 24 also includes a plurality of road wheels 74, for example two road wheels 74, to support the weight of the tracked vehicle 10; and a plurality of tensioning wheels 76, for example two tensioning wheels 76, to maintain the track belt 36 in constant tension about the drive wheel 34 and road wheels 74. Preferably each of the road wheels 74 is integrated into a torsion spring assembly 38, which links each road wheel 74 to a track tensioning wheel 76 by means of a torsion spring 98, as best shown in FIGS. 4A and 4B. The torsion spring assembly 38 prevents the track belt 36 from going slack when a road irregularity forces the track belt 36 and road wheel 74 upward away from the road.

An exemplary torsion spring assembly 38 includes a three-membered torsion spring plate 100 having a hub member 102 pivotably mounted about the suspension hub 70 of the frame 44. The hub member 102 defines a generally central hub aperture 104 through which the suspension hub 70 extends. A road wheel member 106 and a tensioning wheel member 108 radiate outward from the hub member 102. A road wheel 74 is rotatably mounted on a road wheel axle 110 at the end of the road wheel member 106 distal to the hub member 102. A tensioning wheel 76 is mounted at the distal end of the tensioning wheel member 108, on a tensioning wheel axle 112. The lengths of the road wheel member 106 and the tensioning wheel member 108, and the angle described between these two members, is such that the road wheel 74 is brought into contact with a section of the track belt 36 that is in contact with a road surface, and the tensioning wheel 76 is brought into contact with a section of the track belt 36 that is not in contact with the road surface. The torsion spring assembly 38 also includes a torsion spring 98 to resist the upward pivoting of the three-membered torsion spring plate 100, that is, the pivoting of the three-membered torsion spring plate 100 in the direction away from the road surface. The torsion spring 98 includes a first arm 114 and a second arm 115, the first arm 114 being affixed to either the road wheel member 106 or the tensioning wheel member 108 of the three-membered torsion spring plate 100, and second arm 115 being affixed to the suspension hub 70 or another fixed point (not shown) on the frame 44.

Figure 5A:
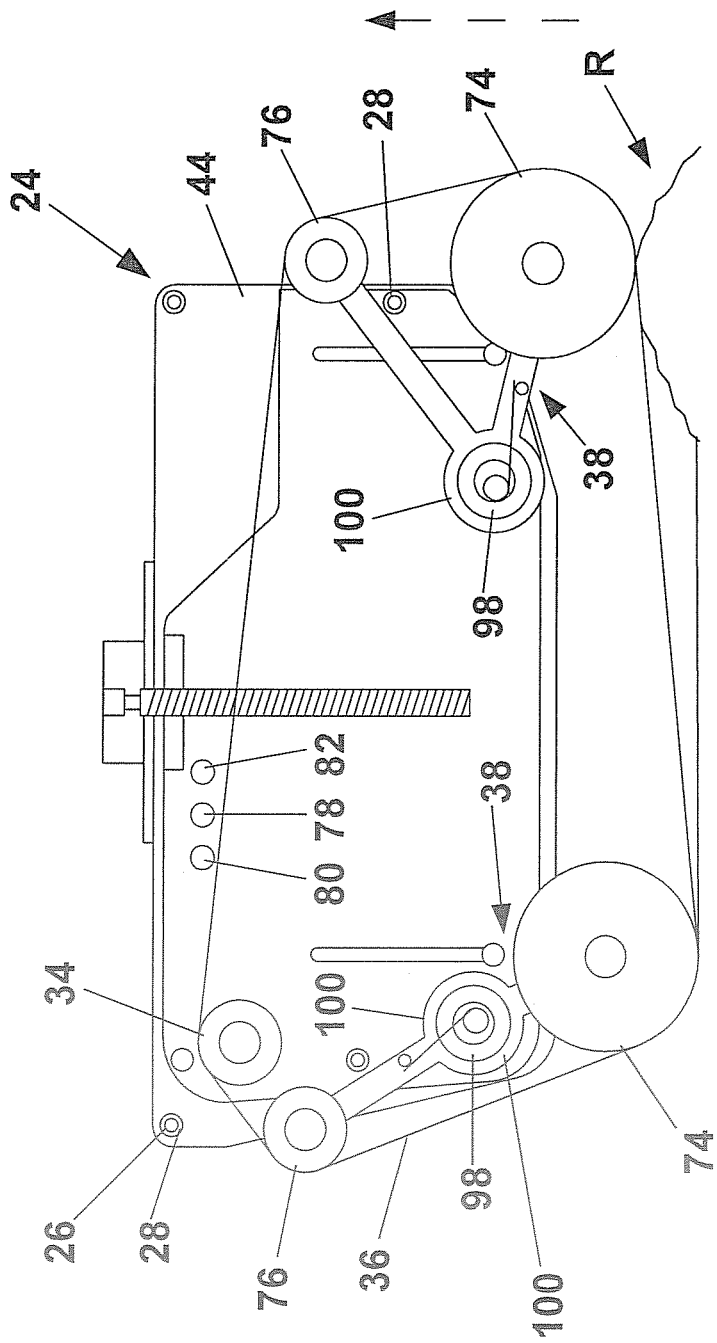
FIG. 5A shows a frontal semi-schematic view of the reaction of a torsion spring assembly of the present invention to an irregularity in the road (dotted line R), with the direction of pivoting of the torsion spring assembly in response to the irregularity indicated by a dotted arrow.
Figure 5B:
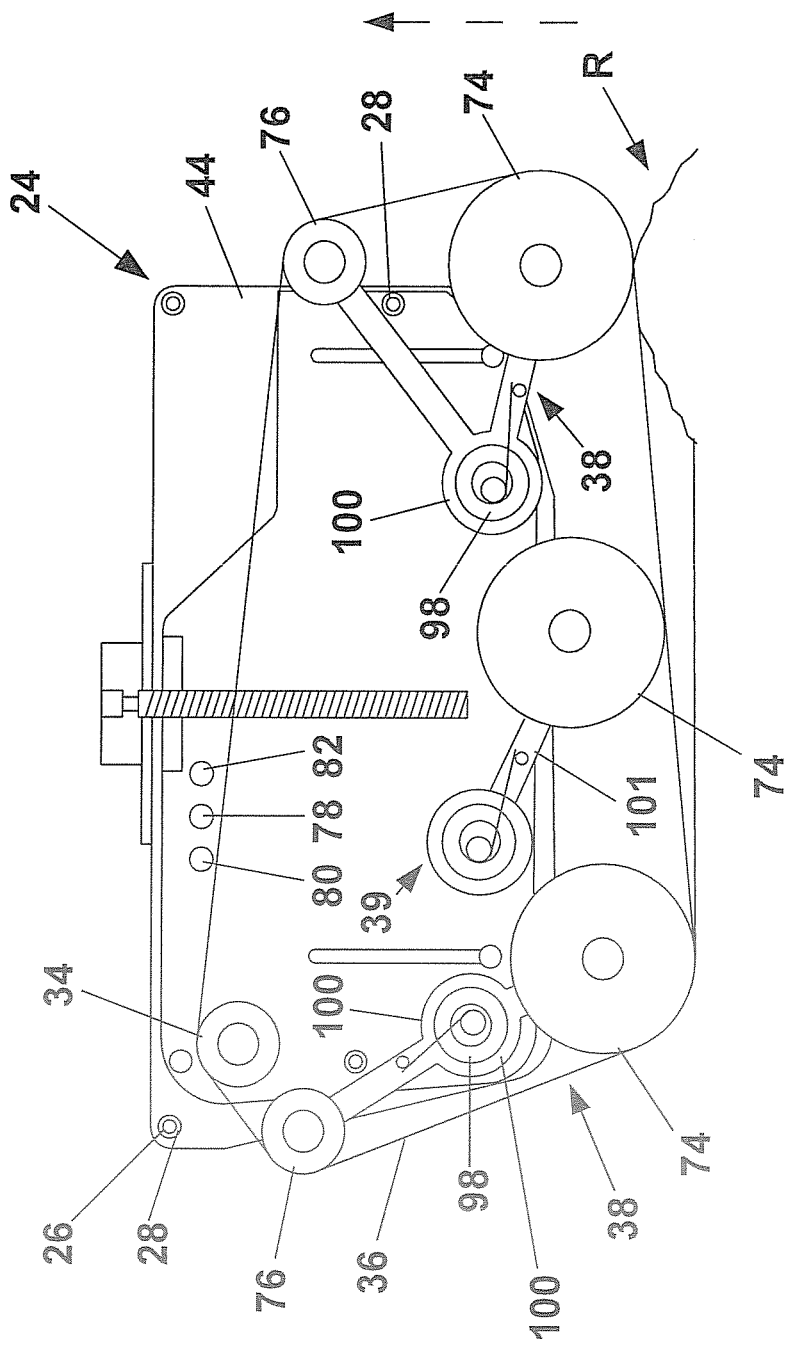
FIG. 5B shows the reaction of a torsion spring assembly of the present invention to an irregularity in the road (dotted line R), in a tracked drive unit having three road wheels.

In operation, as shown in FIGS. 4A and 4B, during operation on level ground, the three-membered torsion spring plate 100 is in an initial position, maintaining the road wheel 74 and tensioning wheel 76 in contact with the track belt 36. As shown in FIGS. 5A and 5B, when an irregularity (R) in the road surface deflects a road wheel 74 upward, introducing slack into the track belt 36, the three-membered torsion spring plate 100 pivots upward about the suspension hub 70, against the force of the torsion spring 98, to assume an activated position. In the activated position, the three-membered torsion spring plate 100 presses the tensioning wheel 76 forcefully against a section of the track belt 36 not in contact with the road. This maintains constant tension in the track belt 36. Once the tracked drive unit 24 has passed over the irregularity in the road, the recoil of the torsion spring 98 causes the three-membered torsion spring plate 100 to pivot back to its initial position, to bring the road wheel 74 back into full contact with the track belt 36, and to reduce the pressure of the tensioning wheel 76 against the track belt 36.

An alternative embodiment of the tracked drive unit 24 includes at least three road wheels 74, with only the road wheels 74 situated at the anterior and posterior of the tracked drive 24 included in a torsion spring assembly 38 having a three-membered torsion spring plate 100. All other road wheels 74 are included in modified torsion spring assemblies 39 each modified torsion spring assembly 39 having a two-membered torsion spring plate 101. The two-membered torsion spring plate 101 includes only a hub member 102 pivotably mounted about a suspension hub 70 of the frame 44, and a road wheel member 106. That is, the road wheels 74 that are situated in positions intermediate to the most anterior and posterior road wheels 74 are not associated with tensioning wheels 76. The structure and operation of the modified torsion spring assembly 39 having a two-membered torsion spring plate 101 is otherwise identical to the structure and operation of a torsion spring assembly 38 having a three membered torsion spring plate 100, as previously described.

Figure 6A:
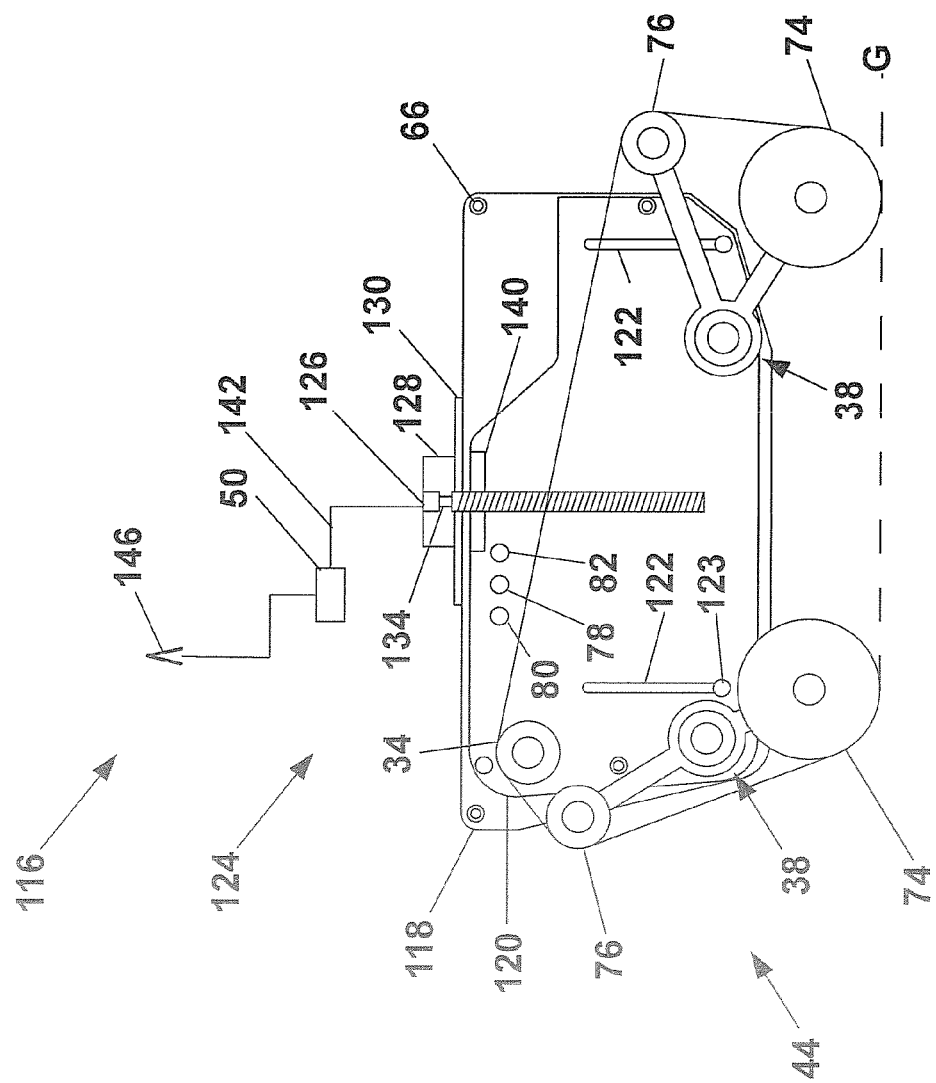
FIG. 6A shows a frontal semi-schematic view of an elevatable tracked drive unit of the present invention in lowered position, with track belts not shown.
Figure 6B:
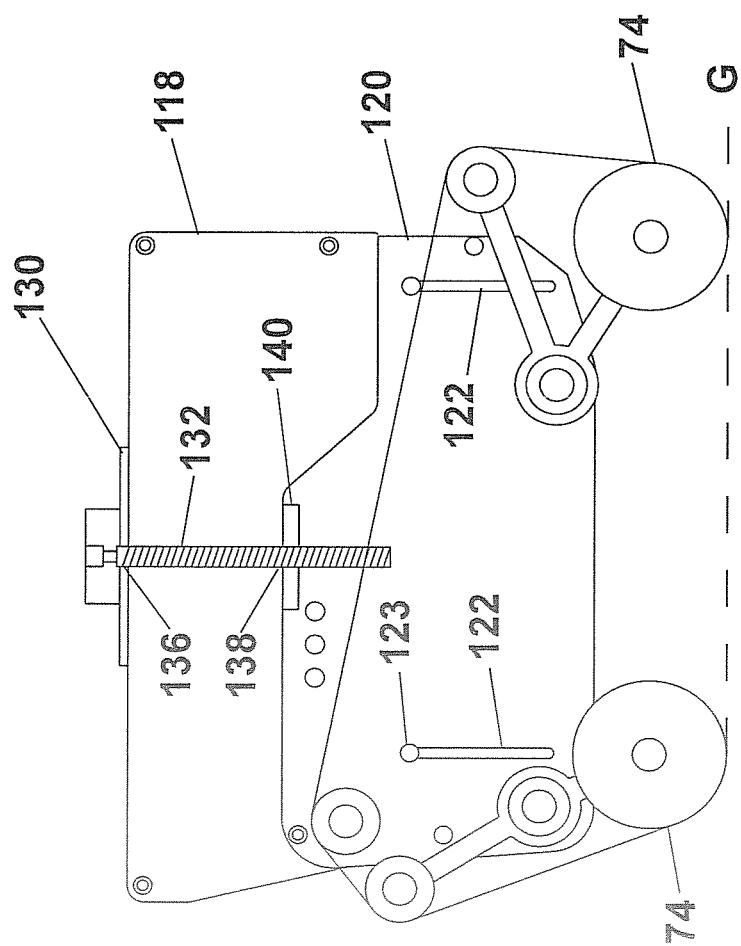
FIG. 6B shows the elevatable tracked drive unit in elevated position.
Figure 6C:
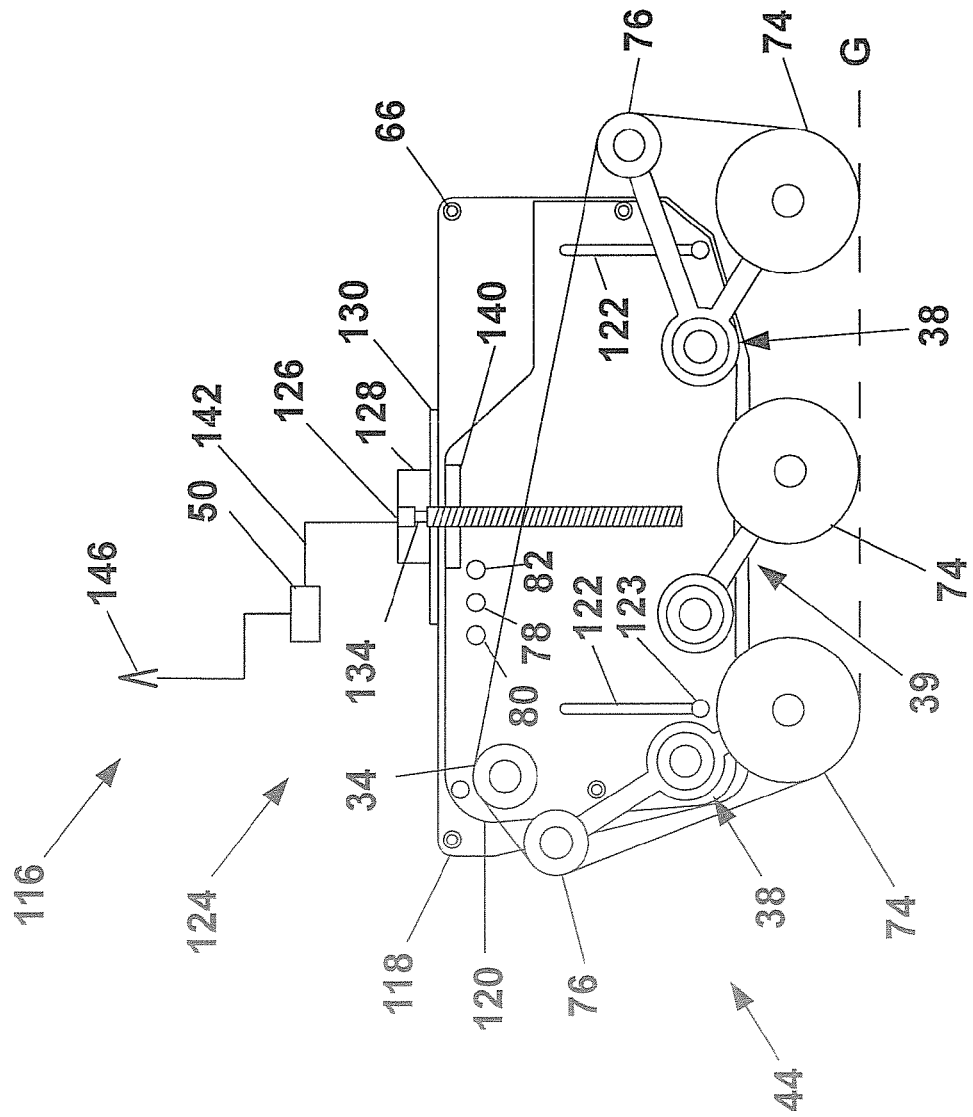
FIG. 6C shows a frontal semi-schematic view of an elevatable tracked drive unit having three road wheels, in lowered position.
Figure 6D:
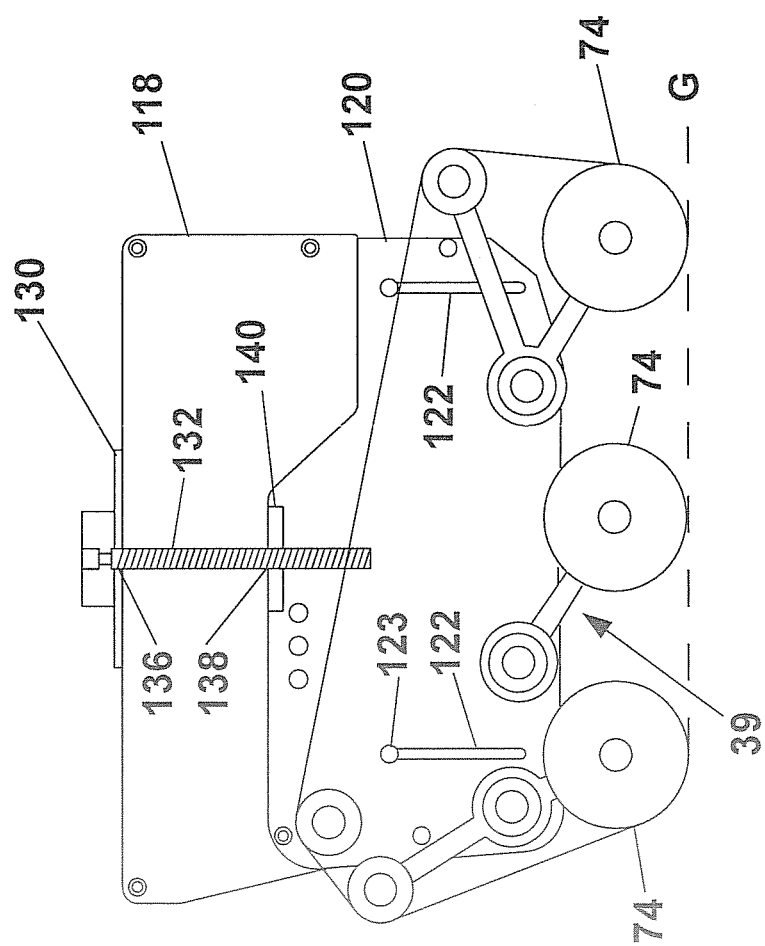
FIG. 6D shows the elevatable tracked drive unit having three road wheels, in elevated position.

The present invention also provides an elevatable tracked drive unit 116, that is, a tracked drive unit that can raise or lower the hull 12 relative to the ground, to adjust the ground clearance of the tracked vehicle 10. In an elevatable tracked drive unit 116 according to the present invention, as best shown in FIGS. 6A and 6B, the frame 44 is divided into an inner frame wall 118 attachable to a lateral side 14 of the tracked vehicle 10, and an outer frame wall 120 slidably engaged to the inner frame wall 118. Preferably, the inner frame wall 118 is slidably engaged to the outer frame wall 120 frame wall by means of two vertical tracks 122 defined on the outer frame wall 120, with the inner frame wall 118 engaging the vertical tracks 122 by means of suitable flanges 123 or wheels (not shown) or any other suitable track engagement hardware. The inner frame wall 118 includes mounting apertures 66, an electrical cable aperture 78, a control and data cable aperture 80, and a coolant fluid line aperture 82, or a unitary aperture (not shown), all as previously described for the tracked drive unit 24. The outer frame wall 120 includes an electric motor 32 connected to a drive wheel 34, torsion spring assemblies 38, a track belt 36, a motor control device 40 and track speed sensor 42, all as previously described.

The inner frame wall 118 is elevatable or lowerable relative to the outer frame wall 120 along the vertical tracks 122. Force to raise or lower the inner frame wall 118 is provided by an elevation assembly 124. An elevation assembly according to the present invention includes an elevation motor 126, preferably an electric motor, stably mounted in an elevation motor mount 128 situated upon the upper surface of an upper skirt 130, which is a ledgelike outward extension of the inner frame wall 118. A spirally threaded elevation screw 132 is mounted upon an elevation motor shaft 134 connected to the elevation motor 126. The elevation screw 132 extends downward through an upper elevation bore 136 defined in the upper skirt 130 and through a lower elevation bore 138 defined in a lower skirt 140, which extends outward from the outer frame wall 120. The upper elevation bore 136 and lower elevation bore 138 are in axial alignment with each other and with the elevation screw 132, and include spiral threads (not shown) complementary to those of the elevation screw 132.

In operation, the rotation of the elevation screw 132 forces the inner frame wall 118, and the attached hull 12, to slide upward or downward relative to the outer frame wall 120 along the vertical tracks 122, as best shown in FIGS. 6A to 6D. The sliding movement of the inner fame wall 118 relative to the inner frame wall 118 raises or lowers the hull 12 relative to the ground (line G in FIGS. 6A to 6B). That is because the hull 12 is attached to the inner frame wall 118, and the outer frame wall 120 is attached to the road wheels 74 that 120 support the tracked vehicle 10 upon the ground.

The elevation motor 126 of each elevation assembly 124 receives electrical power via an elevation power cable 142 connected to driving control system 50, which will be described in detail. An operator preferably controls the operation of each elevation motor 126 by means of an elevation control 146 connected to the driving control system 50, which receives instructions from the elevation control 146 and issues commands accordingly to the elevation motor 126. The connection between the elevation power cable 142 and the elevation motor 126 is preferably mediated by a quick release plug (not shown) to facilitate detachment of an elevatable tracked drive unit 116 as necessary. In embodiments of the tracked vehicle having remote tracked drive jettisoning capability, a severing charge (not shown) is provided to sever the elevation power cable 142 during the process of remote jettisoning.

Figure 7:
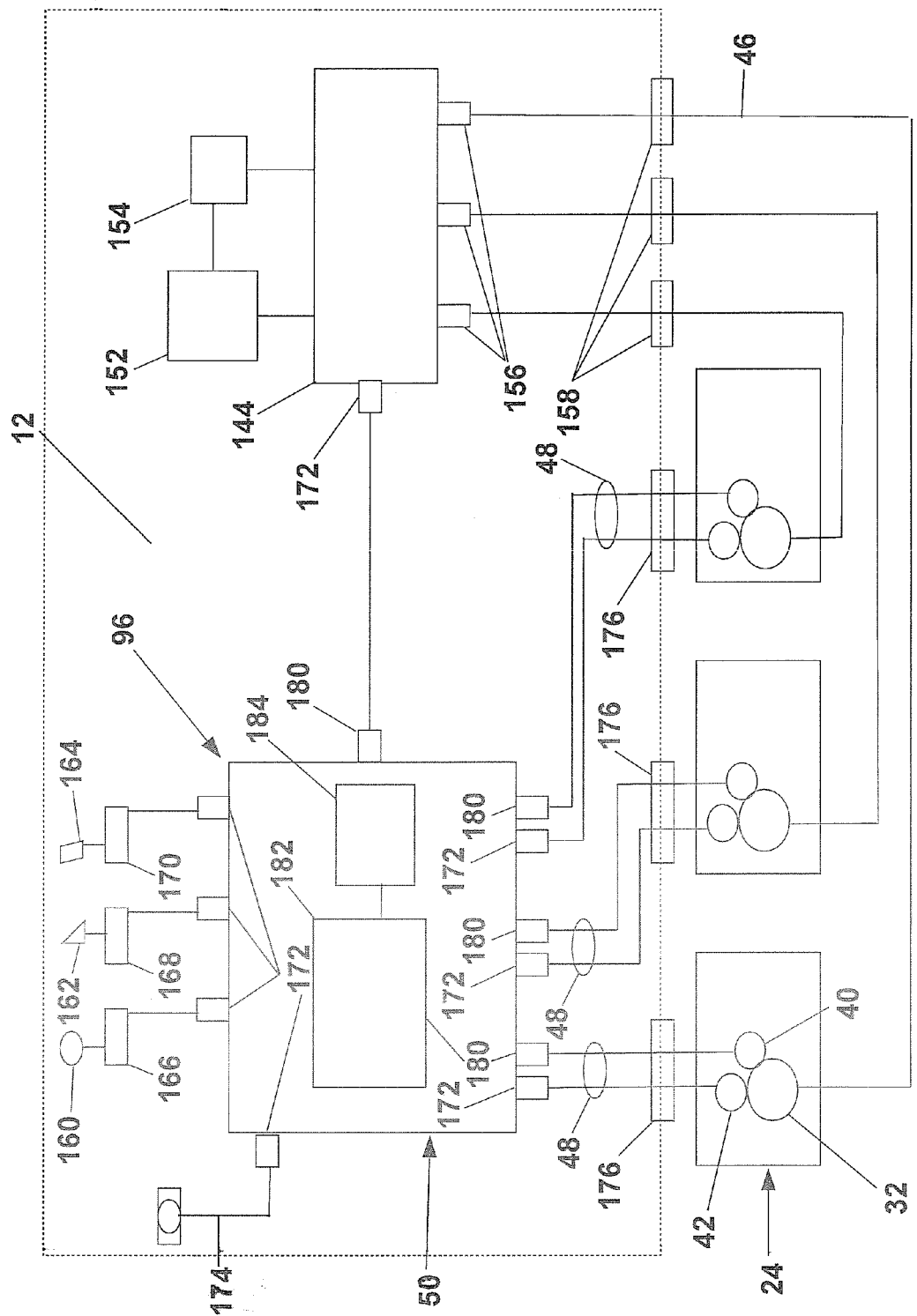
FIG. 7 shows a schematic diagram of the driving control system and electrical supply of a tracked vehicle of the present invention in relation to three typical tracked drive units on a single said of the tracked vehicle, with the dotted rectangle indicating the boundaries of the hull of the tracked vehicle, and unlabelled lines indicating electrical or data connections between indicated components.

The electric motors 32 of the tracked drive units 24 are powered by a power plant 152 generating an electrical output, the power plant preferably including a gasoline or diesel powered electrical generator, as shown in FIG. 7. The power plant 152 of the tracked vehicle 10 charges at least one battery 154, which can also provide power for the electric motors 32. Electrical power from the power plant 152 and battery 154 is distributed to each of the tracked drive units 24 by an electrical distributor 144, also situated within the hull 12. The electrical distributor 144 is electrically connected to both the power plant 152 and battery 154. The electrical distributor 154 distributes electrical power to each of the tracked drive units 24 according to commands issued by the driving control processor 96, to which it is communicatively connected. In the preferred embodiment, the output of the electrical distributor 154 is distributed from a plurality of distributor terminals 156 via electrical lines to a plurality of electrical hull terminals 158 extending through the lateral sides 14 of the hull 12. Each electrical hull terminal 158 supplies power to a single tracked drive unit 24, and is situated in proximity to the tracked drive unit 24 being supplied. Each electrical hull terminal 158 is connected to the electrical motor 32 of a tracked drive unit 24 by means of an electrical cable 46 which extends from the electrical hull terminal 158, through the previously described electrical cable aperture 78 defined in the frame 44 to connect with the electric motor 32. The connections between the electrical cable 46, the electrical hull terminal 158, and the electric motor 32 can be mediated by any suitable electrical connecting means known in the art. Alternatively, electrical power can be conveyed from the electrical distributor terminals 156 by electrical cables directly interconnecting connecting the distributor terminals 156 to the electrical motors 32, without the intervention of a hull terminal 158 (not shown). The advantage of embodiments having electrical hull terminals 158 is the ease of disconnection of the electric motor 32 from the electrical distributor 154 during manual removal of a tracked drive unit 24.

The tracked vehicle 10 includes driving controls of any suitable type known in the art, including a steering control 160, such as a steering wheel or joystick, a brake control 162, such as a brake pedal, and a propulsion control 164, such as an accelerator pedal. In the tracked vehicle 10 of the present invention, manipulations of the driving controls are transduced into appropriate changes in speeds of the tracked drive units 24 by a driving control system 50. The driving control system 50 includes the driving controls previously cited; a steering control sensor 166 operatively connected to the steering control 160, a brake sensor 168 operatively connected to the brake control 162, and a propulsion control sensor 170 operatively connected to the propulsion control 164, with each sensor transmitting driver instructions in the form of electronic signals via input data busses 172 to the driving control processor 96. The driving control system 50 also includes feedback sensors to transmit feedback data regarding vehicle speed and direction to the driving control processor 96 via input data busses 172. The feedback sensors include a plurality of track speed sensors 42, each of which is located in a tracked drive unit 24 Preferably each track speed sensor 42 reads the speed of the drive wheel 34 by any mechanical, optical, or electronic sensing means known in the art, although other measures of track speed can alternatively be sensed. The feedback sensors also include an accelerometer 174, to sense changes in direction of the tracked vehicle 10. The accelerometer 174 is situated in any location on the tracked vehicle 10 that permits it to accurately sense changes in the direction of locomotion. The driving control system 50 also includes the electrical distributor 144, which was described previously. The driving control processor 96 issues commands to the electrical distributor 144 via signal lines connecting an output data bus 180 of the driving control processor 96 to an input data bus 172 of the electrical distributor 144.

In operation, driver instructions and feedback data are integrated by the driving control processor 96, which accordingly regulates the speed and direction of each of the tracked drives 24. In the preferred embodiment, this regulation is exerted at least in part by instructions transmitted to the electrical distributor 144 to alter or maintain the amount of electrical power delivered to the electric motor 32 of each tracked drive unit 24. Regulation can additionally be exerted by direct commands from the driving control processor 96 to at least one motor control device 40 communicatively connected to each electric motor 32. The motor control devices 40 can include but are not limited to, a motor reversal switch, to reverse the direction of track movement, and a motor speed control. The driving control processor 96 issues commands to the motor control devices 40 via output data busses 180, with each output data bus 180 being connected to each tracked drive unit 24 via a control and data hull terminal 176 extending through a lateral side 14 of the hull 12. Each control and data hull terminal 176 communicates with a single tracked drive unit 24 by means of a control and data cable 48 extending from the control and data hull terminal 176, through a control and data cable aperture 80 defined in the frame 44 of the tracked drive unit 24, to connect with one or more motor control devices 40 and track speed sensors 42 of the tracked drive unit 24. The connections between the control and data hull terminal 176, the control and data cable 48, and the motor control devices and sensors of the tracked drive 24 can be mediated by any suitable connecting devices known in the art. Alternatively, commands and feedback data can be conveyed between the driving control processor 96 and the tracked drive units 24 by control and data cables directly interconnecting the driving control processor 96 to the motor control devices and sensors of the tracked drive unit 24 without the intervention of a control and data hull terminal 176. In the preferred embodiment, the electrical hull terminal 158 and the control and data hull terminal 176 are integrated into a unitary hull terminal 178, and the electrical cable 46 and control and data cable 48 are integrated into a unitary electrical and control and data conduit 150, as shown in FIG. 4.

A driving control processor 96 according to the present invention includes at least one microprocessor 182 to execute programs including algorithms for processing driving instructions and speed and direction feedback data into appropriate commands to the electrical distributor 144 and to the motor control devices 40 of each tracked drive unit 24 to modulate the speed and direction of movement of each tracked drive unit 24. The driving control processor 96 also includes least one data input bus 172 to receive signals from the driving controls and feedback sensors and at least one data output bus 180 to send commands to the electrical distributor 144 and motor control devices 40. The driving control processor 96 can be preprogrammed with a single driving control program, or can include a program memory 184 from which the driving control processor 96 can access specific driving control programs for specific driving conditions.

In an example of operation, a driver instruction to accelerate the tracked vehicle 10 is executed by the driving control processor 96 as commands for uniform acceleration of all tracked drive units 24. The commands can take the form of commands issued to the electrical distributor 144 to uniformly increase power to all electric motors 32, commands to motor controllers 40 to increase the speed of the electrical motors 32, or a combination of both types of commands. A driver instruction to steer left is executed by the driving control processor 96 in a similar manner, but with commands to increase the speeds of the tracked drives units 24 on the right side of the tracked vehicle 10, decrease the speeds of the tracked drive units 24 on the left side, or both. A driver instruction for a very sharp left turn may be executed as a set of commands including commands to reverse the direction of one or more tracked drive units 24 on the left side of the tracked vehicle 10. If the tracked vehicle 10 is in a situation wherein sharp maneuvering is likely to be required, a sharp maneuver program, biased toward reversals of tracked drive units during steering, can be included in the program memory 184. The sharp maneuver program can be accessed by the driving control processor 96 automatically, upon the sensing of frequent sharp turns by the accelerometer 174, or upon an instruction from the operator.

The driving control processor 96 continually monitors differences between the course instructed by an operator, in the form of discrepancies between signals from the steering control sensor 166 and signals from the accelerometer 174. When such discrepancies are detected, the driving control processor 96 commands appropriate modulations in the speed of the tracked drive units 24 on the appropriate side of the tracked vehicle 10. This course correction function is routinely used to terminate turning actions when the course of the tracked vehicle comes into conformance with an instructed turn. The course correction function also corrects course deviations not instructed by the operator. Such deviations include course deviations caused by the loss of traction by a subset of tracked drive units 24, or deviations created by the jettisoning of a tracked drive unit 24, which reduces the collective speed of the tracked drive units 24 remaining on the side of the jettisoned tracked drive unit 24. In embodiments of the tracked vehicle 10 having remote tracked drive jettisoning capability, a specific program can be included to bias toward increased speed the tracked drives 24 remaining on the side of the vehicle from which a tracked drive 24 has been jettisoned. This pre-programmed bias can produce more consistent course maintenance than would be produced by constant corrections guided by feedback from the accelerometer 172.

In embodiments of the tracked vehicle 10 having remote tracked drive jettisoning capability, a remote jettisoning system 58 is provided to permit an operator to jettison a tracked drive unit 24 by a means of remote control commands. An exemplary remote jettisoning system 58 according the present invention, as best shown in FIG. 8, includes a plurality of explosive bolts 60 or other explosive affixing devices, to affix a tracked drive unit 24 to the mounting posts 26 or other mounting devices of the hull 12, and to allow the tracked drive unit 24 to detach upon explosive disintegration of explosive bolts 60. The remote jettisoning system 58 also includes at least one shaped severing charge 62 to sever the electrical cable 46, control and data cable 48, and coolant fluid line 52. In embodiments wherein the electrical cable 46, control and data cable 48, and coolant fluid line 52 are separated along their entire lengths, a severing charge 62 is situated at any suitable point external to the hull 12 along the lengths of the electrical cable 46, control and data cable 48, and coolant fluid line 52. In the preferred embodiment, the electrical cable 46, data and control cable 48, are combined within a unitary conduit 150 and the unitary conduit 150 is bundled together with the coolant fluid line 52, so that a single shaped severing charge 62 is situated about both the unitary conduit 150 and coolant fluid line 52, as shown in FIG. 8. The remote jettisoning system 58 also includes a power shut-off switch 188 to disconnect the electrical cable 46 from the electrical distributor 144, to prevent the electrical cable 46 from shorting out upon severing. The power shut off switch 188 is preferably situated within the hull 12, and can be located at any point along the electrical lines connecting the electrical distributor 144 to the electrical hull terminals 158. The remote jettisoning system 58 also includes a data shutoff switch 190 to disconnect the data and control cable 48 from the driving control processor 96, to prevent electrical shorts that could damage the driving control processor 96. The data shut off switch 190 is preferably situated within the hull 12, and can be located at any point in the signal lines connecting the driving control processor 96 to the control and data hull terminals 176. The remote jettisoning system also includes a coolant shut-off valve 192 to prevent loss of coolant fluid upon severing of the coolant fluid line 52. The coolant fluid shut-off valve 192 is preferably situated within the hull 12, any point between the coolant pump 55 and the coolant line outlet 57. The remote jettisoning system 58 also includes a detonation circuit 194 to detonate the explosive bolts 60 and shaped severing charges 62, and a shut-off circuit 196 to activate the power shut-off switch 188, the data shut-off switch 190, and the coolant fluid shut-off valve 192. The detonation circuit 194 and shut-off circuit 196 are connected to and operated by a remote jettisoning control 198 which is accessible to an operator situated within the hull 12. The detonation circuit 194 additionally passes through the upper portion 20 of the hull 12 at a detonation circuit outlet 200 to connect to the explosive bolts 60 and the severing charges 62.

In operation, the remote jettisoning control 198 is actuated by an operator. Actuation of the remote jettisoning control 198 causes the activation of the power shut-off switch 188, data shut-off switch 190 and coolant fluid shut-off valve 192 via the shut-off circuit 196. Actuation of the remote jettisoning control 198 also causes the triggering of the explosive bolts 60 and severing charges 62 via the detonation circuit 194. As the explosive bolts 60, the electrical cable 46, control and data cable 48, and coolant fluid line 52 represent the only connections between a tracked drive unit 24 and the tracked vehicle 10, activation of the remote jettisoning control 198 permits the tracked vehicle 10 to separate from the tracked drive unit 24 being jettisoned. Preferably, the shut-off circuit 196 is activated prior to the activation of the detonation circuit 194, to minimize the possibility of electrical shorting and coolant fluid loss. A jettisoning microchip controller 202, preprogrammed to close the detonation circuit 194 and shut-off circuit 196 in an optimal sequence, can be operatively connected to the remote jettisoning control 198.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:
1. A tracked vehicle including a hull and a plurality of self contained tracked drive units connected to said hull, said hull containing an electrical power plant, a driving control system, and a motor cooling system,
  each of said plurality of self contained tracked drive units including a frame to contain an electric motor, a drive wheel to propel a track belt, said drive wheel being powered by said electric motor, a plurality of road wheels to support said tracked vehicle, and a plurality of tensioning wheels to maintain said track belt in constant tension about said drive wheel and said road wheels, each of said self contained tracked drive units being connected to said hull by affixing devices to affix said frame to corresponding mounting devices on said hull; by an electrical cable to transmit electrical power from said power plant to said electric motor; by a coolant fluid line to convey coolant fluid from said cooling system to said electric motor, and by a control and data cable to convey electronic signals between said driving control system and said self contained tracked drive unit, said tracked vehicle being separable from each of said self contained tracked drive units by the detachment of said affixing devices from said mounting devices on said hull, the disconnection of said electrical cable from said electric motor, the disconnection of said coolant fluid line from said electric motor, and the disconnection of said control and data cable from said self contained tracked drive unit a jettisoning system for automatically dismounting said plurality of self contained tracked drive units from said tracked vehicle.

2. The tracked vehicle of claim 1, said tracked vehicle retaining a plurality of remaining self contained tracked drive units after the separation of at least one self contained tracked drive unit, said tracked drive vehicle having the ability to locomote by means of said plurality of remaining self contained tracked drive units.

3. The tracked vehicle of claim 1, wherein said plurality of road wheels and said plurality of tensioning wheels are included in a plurality of torsion spring assemblies to maintain constant tension of said tracked belt about said drive wheel and said plurality of road wheels, each of said torsion spring assemblies including a road wheel of the plurality of road wheels connected to a tensioning wheel of said plurality of tensioning wheels by a means of a three-membered torsion spring plate pivotable about a suspension hub projecting outward from said frame, said three-membered torsion spring plate having a hub member pivotably mounted about said suspension hub, a road wheel member radiating from said hub member, said road wheel being rotatably mounted upon said road wheel member, and a tensioning wheel member radiating from said hub member, said tensioning wheel being rotatably mounted upon said tensioning wheel member, said three-membered torsion spring plate being resiliently connected to said suspension hub by a torsion spring having a first arm connected to said suspension hub and a second arm connected either to said road wheel member or to said tensioning wheel member, said three-membered torsion spring plate having an initial position for maintaining said road wheel and said tensioning wheel in contact with said track belt, said three-membered torsion spring plate being pivotable upward into an activated position, against the torsional force of said torsion spring, upon a vertical displacement of said road wheel, said activated position being characterized by increased pressure of said tensioning wheel against said track belt, the recoil of said torsion spring tending to pivot said three-membered torsion spring plate downward to return to said initial position.

4. The tracked vehicle of claim 1, wherein said plurality of road wheels is further defined as at least three road wheels, wherein at least one of said road wheels is included in a modified torsion spring assembly, said modified torsion spring assembly including a two-membered torsion spring plate pivotably mounted about a suspension hub projecting outward from said frame, said two-membered torsion spring plate having a hub member pivotably mounted about said suspension hub, a road wheel member radiating from said hub member, said road wheel being rotatably mounted upon said road wheel member, said two-membered torsion spring plate being resiliently connected to said suspension hub by a torsion spring having a first arm connected to said suspension hub and a second arm connected to said road wheel member, said two-membered torsion spring plate having an initial position for maintaining said at least one road wheel in contact with said track belt, said two-membered torsion spring plate being pivotable upward into an activated position, against the torsional force of said torsion spring, upon a vertical displacement of said road wheel, the recoil of said torsion spring tending to pivot said two membered torsion spring plate downward to return to said initial position.

5. Tracked vehicle of claim 1, wherein said hull includes a lower portion extending downward below a longitudinal axis defined by said mounting devices, said lower portion of said hull having a smooth, continuous surface.

6. The tracked vehicle of claim 5, wherein lower portion of said hull is further defined as being V-shaped in cross section.

7. The tracked vehicle of claim 1 wherein said driving system is further defined as a driving system to control the speed and direction of locomotion of each of said tracked drive units, said driving system comprising a plurality of driving controls for the entry of driver instructions, said plurality of driving controls including a steering control, a brake control, and a propulsion control; a plurality of driving control sensors operatively connected to said driving controls, to transmit said driver instructions to a driving control processor, said plurality of driving control sensors including a steering control sensor operatively connected to said steering control, a brake sensor operatively connected to said brake control, and a propulsion control sensor operatively connected to said propulsion control; a plurality of feedback sensors operatively connected to said driving control processor, to transmit feedback data regarding the speed and direction of said tracked vehicle to said driving control processor, said plurality of feedback sensors including a plurality of track speed sensors to sense the speed and direction of each of said track belt of said tracked drive unit, and at least one accelerometer to sense directional changes in the locomotion of said tracked vehicle, said driving control processor configured to integrate said driver instructions with said feedback data and accordingly issue commands to regulate the speed and direction of each of said electric motors, said driving control processor being communicatively connected to an electrical distributor to receive said commands issued by said driving control processor, said electrical distributor electrically interconnecting said electrical power plant with each of said electric motors, said electrical distributor configured to regulate the distribution of electrical power from said electrical power plant to each of said electric motors according to said commands issued by said driving control processor.

8. The tracked vehicle of claim 7, wherein each of said electric motors additionally includes at least one motor control device communicatively connected to said electric motor, said at least one motor control device communicatively connected to said driving control processor, to regulate the operation of said electric motor according to commands received from said driving control processor.

9. The tracked vehicle of claim 8, wherein said at least one motor control device is selected from the group of devices consisting of a motor reversal switch and a motor speed control.

10. The tracked vehicle of claim 1, wherein each of said self contained tracked drive units is further defined as an elevatable tracked drive unit, wherein said frame includes an inner frame wall attached to said hull of said tracked vehicle and an outer frame wall to contain said electric motor, said drive wheel, said track belt, said plurality of road wheels, and said plurality of tensioning wheels,
   said inner frame wall being elevatable in relation to said outer frame wall by means of a motorized elevation screw assembly, the elevation of said inner frame wall elevating said hull in relation to the said road wheels, to adjust the ground clearance of said hull.

11. A tracked vehicle with remote tracked drive jettisoning capability, said tracked vehicle including a hull and a plurality of self contained tracked drive units connected to said hull, said hull containing an electrical power plant, a driving control system, and a motor cooling system,
   each of said plurality of self contained tracked drive units including a frame to contain an electric motor, a drive wheel to propel a track belt, said drive wheel being powered by said electric motor, a drive wheel powered by said electric motor, to propel a track belt, a plurality of road wheels to support said tracked vehicle, and a plurality of tensioning wheels to maintain said track belt in constant tension about said drive wheel and said road wheels,
   each of said self contained tracked drive units being connected to said hull by explosive affixing devices to affix said frame of said tracked drive unit to corresponding mounting devices on said hull, said explosive affixing devices being destructible by detonation of said explosive affixing devices; by an electrical cable to transmit electrical power from said power plant to said electric motor; by a coolant fluid line to convey coolant fluid from said cooling system to said electric motor; and by a control and data cable to convey electronic signals between said driving control system and said self contained tracked drive unit;
   said electrical cable, said control and data cable, and said coolant fluid line each being severable by an explosive severing charge situated about said electrical cable, said coolant fluid line, and said control and data cable,
   said electrical cable including an electrical shut-off switch situated between said severing charge and said power plant, said control and data cable including a data shut-off switch situated between said severing charge and said driving control system, said coolant fluid line including coolant fluid shut-off valve situated between said motor cooling system and said tracked drive units,
   each of said self contained tracked drive units being separable from said tracked vehicle upon destruction of said explosive affixing devices, the severance of said electrical cable, the severance of said control and data cable, and the severance of said coolant fluid line,
   said tracked vehicle including a remote jettisoning system including a shut-off circuit activatable to actuate said electrical shut-off switch, said data shut-off switch, and said coolant fluid shut-off valve; a detonation circuit activatable to detonate said explosive affixing devices and said severing charges; and a remote jettisoning control operable to activate said shut-off circuit and said detonation circuit,
   said tracked vehicle retaining a plurality of remaining self contained tracked drive units after the separation of at least one self contained tracked drive unit, said tracked drive vehicle having the ability to locomote by means of said plurality of remaining self contained tracked drive units.

12. The tracked vehicle of claim 11, wherein said plurality of road wheels and said plurality of tensioning wheels are included in a plurality of torsion spring assemblies to maintain constant tension of said tracked belt about said drive wheel and said plurality of road wheels,
   each of said torsion spring assemblies including a road wheel of the plurality of road wheels connected to a tensioning wheel of said plurality of tensioning wheels by a means of a three-membered torsion spring plate pivotable about a suspension hub projecting outward from said frame,
   said three-membered torsion spring plate having a hub member pivotably mounted about said suspension hub, a road wheel member radiating from hub member, said road wheel being rotatably mounted upon said road wheel member, and a tensioning wheel member radiating from said hub member, said tensioning wheel being rotatably mounted upon said tensioning wheel member,
   said three-membered torsion spring plate being resiliently connected to said suspension hub by a torsion spring having a first arm connected to said suspension hub and a second arm connected to either said road wheel member or said tensioning wheel member,
   said three-membered torsion spring plate having an initial position for maintaining said road wheel and said tensioning wheel in contact with said track belt,
   said three-membered torsion spring plate being pivotable upward into an activated position, against the torsional force of said torsion spring, upon a vertical displacement of said road wheel, said activated position being characterized by increased pressure of said tensioning wheel against said track belt, the recoil of said torsion spring tending to pivot said three-membered torsion spring plate downward to return to said initial position.

13. The tracked vehicle of claim 11, wherein said plurality of road wheels is further defined as at least three road wheels, wherein at least one of said road wheels is included in a modified torsion spring assembly, said modified torsion spring assembly including a two-membered torsion spring plate pivotably mounted about a suspension hub projecting outward from said frame,
   said two-membered torsion spring plate having a hub member pivotably mounted about said suspension hub,
   a road wheel member radiating from said hub member, said road wheel being rotatably mounted upon said road wheel member,
   said two-membered torsion spring plate being resiliently connected to said suspension hub by a torsion spring having a first arm connected to said suspension hub and a second arm connected to said road wheel member,
   said two-membered torsion spring plate having an initial position for maintaining said at least one road wheel in contact with said track belt,
   said two-membered torsion spring plate being pivotable upward into an activated position, against the torsional force of said torsion spring, upon a vertical displacement of said road wheel, the recoil of said torsion spring tending to pivot said two membered torsion spring plate downward to return to said initial position.

14. Tracked vehicle of claim 11, wherein said hull includes a lower portion extending downward below a longitudinal axis defined by said mounting devices, said lower portion of said hull having a smooth, continuous surface.

15. The tracked vehicle of claim 14, wherein lower portion of said hull is further defined as being V-shaped in cross section.

16. The tracked vehicle of claim 11 wherein said driving system is further defined as a driving system to control the speed and direction of locomotion of each of said tracked drive units, said driving system comprising a plurality of driving controls for the entry of driver instructions, said plurality of driving controls including a steering control a brake control, and a propulsion control;
a plurality of driving control sensors operatively connected to said driving controls, to transmit said driver instructions to a driving control processor, said plurality of driving control sensors including a steering control sensor operatively connected to said steering control, a brake sensor operatively connected to said brake control, and a propulsion control sensor operatively connected to said propulsion control, a plurality of feedback sensors operatively connected to said driving control processor, to transmit feedback data regarding the speed and direction of said tracked vehicle to said driving control processor, said plurality of feedback sensors including a plurality of track speed sensors to sense the speed and direction of said track belt of said tracked drive unit, and at least one accelerometer to sense directional changes of said tracked vehicle,
said driving control processor configured to integrate said driver instructions with said feedback data and accordingly issue commands to regulate the speed and direction of each of said electric motors, said driving control processor being communicatively connected to an electrical distributor to receive said commands issued by said driving control processor,
said electrical distributor electrically interconnecting said electrical power plant with each of said electric motors, said electrical distributor configured to regulate the distribution of electrical power from said electrical power plant to each of said electric motors according to said commands issued by said driving control processor.

17. The tracked vehicle of claim 16, wherein each of said electric motors additionally includes at least one motor control device communicatively connected to each of said electric motors, said at least one motor control device communicatively connected to said driving control processor, to control the operation of each of said electric motors according to commands issued by said driving control processor.

18. The tracked vehicle of claim 17, wherein said at least one motor control device is selected from the group of devices consisting of a motor reversal switch and a motor speed control.

19. The tracked vehicle of claim 11, wherein each of said self contained tracked drive units is further defined as an elevatable tracked drive unit, wherein said frame includes an inner frame wall attached to said hull of said tracked vehicle and an outer frame wall to contain said electric motor, said drive wheel, said track belt, said plurality of road wheels, and said plurality of tensioning wheels,
said inner frame wall being elevatable in relation to said outer frame wall by means of a motorized elevation screw assembly, the elevation of said inner frame wall elevating said hull in relation to the said road wheels, to adjust the ground clearance of said hull.

20. A self-contained tracked drive unit for use with a tracked drive vehicle having a hull containing mounting devices, an electrical power plant, a driving control system, and a motor cooling system, said self-contained track drive unit including:
a frame to contain an electric motor, a drive wheel to propel a track belt, said drive wheel being powered by said electric motor, a plurality of road wheels to support said tracked vehicle, and a plurality of tensioning wheels to maintain said track belt in constant tension about said drive wheel and said road wheels, affixing devices for mounting said self-contained track drive unit to said mounting devices of said hull, and a jettisoning system for automatically dismounting said self-contained tracked drive unit from said tracked vehicle when mounted thereto,
said self-contained tracked drive unit having; an electrical cable to transmit electrical power from said power plant to said electric motor; a coolant fluid line to convey coolant fluid from said cooling system to said electric motor, and a control and data cable to convey electronic signals between said driving control system and said self-contained tracked drive unit,
said self-contained tracked drive unit is separable from said hull when attached thereto upon activation of said jettisoning system and the subsequent detachment of said affixing devices from said mounting devices on said hull, the disconnection of said electrical cable from said electric motor, the disconnection of said pressurized fluid line from said electric motor, and the disconnection of said control and data cable from said driving control system.

21. The self-contained tracked drive unit of claim 20, wherein said plurality of road wheels and said plurality of tensioning wheels are included in a plurality of torsion spring assemblies to maintain constant tension of said tracked belt about said drive wheel and said plurality of road wheels,
each of said torsion spring assemblies including a road wheel of the plurality of road wheels connected to a tensioning wheel of the plurality of tensioning wheels by a means of a three-membered torsion spring plate pivotable about a suspension hub projecting outward from said frame,
said three-membered torsion spring plate having a hub member pivotably mounted about said suspension hub, a road wheel member radiating from hub member, said road wheel being rotatably mounted upon said road wheel member, and a tensioning wheel member radiating from said hub member, said tensioning wheel being rotatably mounted upon said tensioning wheel member,
said three-membered torsion spring plate being resiliently connected to said suspension hub by a torsion spring having a first arm connected to said suspension hub and a second arm connected to either said road wheel member or said tensioning wheel member,
said three-membered torsion spring plate having an initial position for maintaining said road wheel and said tensioning wheel in contact with said track belt,
said three-membered torsion spring plate being pivotable upward into an activated position, against the torsional force of said torsion spring, upon a vertical displacement of said road wheel, said activated position being characterized by increased pressure of said tensioning wheel against said track belt, the recoil of said torsion spring tending to pivot said three-membered torsion spring plate downward to return to said initial position.

22. The self-contained tracked drive unit of claim 20, wherein said plurality of road wheels is further defined as at least three road wheels, wherein at least one of said road wheels is included in a modified torsion spring assembly, said modified torsion spring assembly including a two-membered torsion spring plate pivotably mounted about a suspension hub projecting outward from said frame, said two-membered torsion spring plate having a hub member pivotably mounted about said suspension hub, a road wheel member radiating from said hub member, said road wheel being rotatably mounted upon said road wheel member, said two-membered torsion spring plate being resiliently connected to said suspension hub by a torsion spring having a first arm connected to said suspension hub and a second arm connected to said road wheel member, said two-membered torsion spring plate having an initial position for maintaining said at least one road wheel in contact with said track belt, said two-membered torsion spring plate being pivotable upward into an activated position, against the torsional force of said torsion spring, upon a vertical displacement of said road wheel, the recoil of said torsion spring tending to pivot said two membered torsion spring plate downward to return to said initial position.

23. The self-contained tracked drive unit of claim 20, further defined as an elevatable tracked drive unit, wherein said frame includes:

an inner frame wall attached to said hull of said tracked vehicle and an outer frame wall to contain said electric motor, said drive wheel, said track belt, said plurality of road wheels, and said plurality of tensioning wheels, said inner frame wall being elevatable in relation to said outer frame wall by means of a motorized elevation screw assembly, the elevation of said inner frame wall elevating said hull in relation to the said road wheels, to adjust the ground clearance of said hull.

24. A method for remotely jettisoning a self contained tracked drive unit from a tracked vehicle having multiple self contained tracked drive units, each tracked drive unit being contained in a frame, including the steps of:

actuating a remote jettisoning control, activating a detonation circuit, detonating a severing charge situated about an electrical cable connecting an electrical distributor to a motor of each self contained tracked drive unit;

severing the electrical cable, detonating a severing charge situated about a data and control cable connecting a driving control processor to a motor controller and to a track speed sensor of the tracked drive unit, severing the data and control cable, detonating a severing charge situated about a coolant fluid line connecting a motor cooling system to the electric motor of the tracked drive unit;

severing the coolant fluid line, detonating a plurality of explosive affixing devices attaching the frame of the tracked drive unit to a plurality of mounting devices on a hull of the tracked drive vehicle, detaching the frame of the tracked drive unit from the plurality of mounting devices; and remotely jettisoning the tracked drive unit from the tracked vehicle.

25. The method of claim 24, further including, before the step of activating a detonation circuit, the steps of:

activating a power shut-off switch;

shutting off the power in the electrical cable;

activating a data shut-off switch;

shutting off the flow of commands and data through the control and data cable;

activating a coolant shut-off valve; and shutting off the flow of coolant fluid through the coolant fluid line.

* * * * *